US012367844B2

(12) United States Patent
Hu et al.

(10) Patent No.: US 12,367,844 B2
(45) Date of Patent: Jul. 22, 2025

(54) DRIVE METHOD OF DISPLAY PANEL AND DISPLAY APPARATUS

(71) Applicants: Beijing BOE Display Technology Co., Ltd., Beijing (CN); BOE Technology Group Co., Ltd., Beijing (CN)

(72) Inventors: Pengfei Hu, Beijing (CN); Jianhua Huang, Beijing (CN); Dongchuan Chen, Beijing (CN); Yingying Qu, Beijing (CN); Shulin Yao, Beijing (CN); Yue Yang, Beijing (CN); Wenpeng Ma, Beijing (CN); Zheng Zhang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/022,485

(22) PCT Filed: Apr. 15, 2022

(86) PCT No.: PCT/CN2022/087147
§ 371 (c)(1),
(2) Date: Feb. 21, 2023

(87) PCT Pub. No.: WO2023/197308
PCT Pub. Date: Oct. 19, 2023

(65) Prior Publication Data
US 2024/0265885 A1 Aug. 8, 2024

(51) Int. Cl.
*G09G 3/20* (2006.01)
*G09G 3/36* (2006.01)

(52) U.S. Cl.
CPC ......... *G09G 3/3607* (2013.01); *G09G 3/2096* (2013.01); *G09G 2310/08* (2013.01);
(Continued)

(58) Field of Classification Search
CPC ...... G09G 3/20; G09G 3/2096; G09G 3/3607; G09G 2310/08; G09G 2320/0233; G09G 2320/041
See application file for complete search history.

(56) References Cited

U.S. PATENT DOCUMENTS

2007/0024563 A1 2/2007 Oura
2008/0018569 A1* 1/2008 Sung .................... G09G 3/3233 345/82
(Continued)

FOREIGN PATENT DOCUMENTS

CN 1909052 A 2/2007
CN 106098005 A 11/2016
(Continued)

*Primary Examiner* — Ryan A Lubit
(74) *Attorney, Agent, or Firm* — IPro, PLLC

(57) ABSTRACT

Provides are a drive method of a display panel and a display apparatus. The drive method of the display panel includes: obtaining a current temperature of the display panel; obtaining a current overdrive lookup table corresponding to the current temperature according to the current temperature and initial overdrive lookup tables corresponding to prestored set temperatures, wherein the initial overdrive lookup tables include a plurality of different first gray-scale values, a plurality of different second gray-scale values and initial gray-scale values corresponding to any first gray-scale value and any second gray-scale value, and the current overdrive lookup table includes a plurality of different first gray-scale values, a plurality of different second gray-scale values and current gray-scale values corresponding to any first gray-scale value and any second gray-scale value; and driving sub-pixels in the display panel to charge corresponding data voltages according to the current overdrive lookup table.

10 Claims, 16 Drawing Sheets

(52) U.S. Cl.
CPC ............... *G09G 2320/0233* (2013.01); *G09G 2320/041* (2013.01)

(56) References Cited

U.S. PATENT DOCUMENTS

| | | | | |
|---|---|---|---|---|
| 2013/0162917 | A1* | 6/2013 | Sagawa | H04N 9/3194 349/5 |
| 2013/0169613 | A1* | 7/2013 | Chen | G09G 3/3611 345/212 |
| 2017/0092217 | A1* | 3/2017 | Mizuno | G09G 3/3685 |
| 2018/0182347 | A1 | 6/2018 | Zhang | |
| 2019/0066608 | A1* | 2/2019 | Watanabe | G09G 3/3607 |
| 2019/0371258 | A1* | 12/2019 | Morein | G09G 3/3696 |
| 2019/0392777 | A1* | 12/2019 | Kim | G09G 3/3688 |
| 2020/0035176 | A1 | 1/2020 | Ohhara | |
| 2020/0388224 | A1* | 12/2020 | Holsteen | G09G 3/20 |

FOREIGN PATENT DOCUMENTS

| | | | |
|---|---|---|---|
| CN | 110782850 | A | 2/2020 |
| CN | 112053658 | A | 12/2020 |

* cited by examiner

LUTL

| | 0 | 16 | 32 | 48 | 64 | 80 | 96 | 112 | 128 | 144 | 160 | 176 | 192 | 208 | 224 | 240 | 255 |
|---|---|---|---|---|---|---|---|---|---|---|---|---|---|---|---|---|---|
| 0 | L1-1 | L1-2 | L1-3 | L1-4 | L1-5 | L1-6 | L1-7 | L1-8 | L1-9 | L1-10 | L1-11 | L1-12 | L1-13 | L1-14 | L1-15 | L1-16 | L1-17 |
| 16 | L2-1 | L2-2 | L2-3 | L2-4 | L2-5 | L2-6 | L2-7 | L2-8 | L2-9 | L2-10 | L2-11 | L2-12 | L2-13 | L2-14 | L2-15 | L2-16 | L2-17 |
| 32 | L3-1 | L3-2 | L3-3 | L3-4 | L3-5 | L3-6 | L3-7 | L3-8 | L3-9 | L3-10 | L3-11 | L3-12 | L3-13 | L3-14 | L3-15 | L3-16 | L3-17 |
| 48 | L4-1 | L4-2 | L4-3 | L4-4 | L4-5 | L4-6 | L4-7 | L4-8 | L4-9 | L4-10 | L4-11 | L4-12 | L4-13 | L4-14 | L4-15 | L4-16 | L4-17 |
| 64 | L5-1 | L5-2 | L5-3 | L5-4 | L5-5 | L5-6 | L5-7 | L5-8 | L5-9 | L5-10 | L5-11 | L5-12 | L5-13 | L5-14 | L5-15 | L5-16 | L5-17 |
| 80 | L6-1 | L6-2 | L6-3 | L6-4 | L6-5 | L6-6 | L6-7 | L6-8 | L6-9 | L6-10 | L6-11 | L6-12 | L6-13 | L6-14 | L6-15 | L6-16 | L6-17 |
| 96 | L7-1 | L7-2 | L7-3 | L7-4 | L7-5 | L7-6 | L7-7 | L7-8 | L7-9 | L7-10 | L7-11 | L7-12 | L7-13 | L7-14 | L7-15 | L7-16 | L7-17 |
| 112 | L8-1 | L8-2 | L8-3 | L8-4 | L8-5 | L8-6 | L8-7 | L8-8 | L8-9 | L8-10 | L8-11 | L8-12 | L8-13 | L8-14 | L8-15 | L8-16 | L8-17 |
| 128 | L9-1 | L9-2 | L9-3 | L9-4 | L9-5 | L9-6 | L9-7 | L9-8 | L9-9 | L9-10 | L9-11 | L9-12 | L9-13 | L9-14 | L9-15 | L9-16 | L9-17 |
| 144 | L10-1 | L10-2 | L10-3 | L10-4 | L10-5 | L10-6 | L10-7 | L10-8 | L10-9 | L10-10 | L10-11 | L10-12 | L10-13 | L10-14 | L10-15 | L10-16 | L10-17 |
| 160 | L11-1 | L11-2 | L11-3 | L11-4 | L11-5 | L11-6 | L11-7 | L11-8 | L11-9 | L11-10 | L11-11 | L11-12 | L11-13 | L11-14 | L11-15 | L11-16 | L11-17 |
| 176 | L12-1 | L12-2 | L12-3 | L12-4 | L12-5 | L12-6 | L12-7 | L12-8 | L12-9 | L12-10 | L12-11 | L12-12 | L12-13 | L12-14 | L12-15 | L12-16 | L12-17 |
| 192 | L13-1 | L13-2 | L13-3 | L13-4 | L13-5 | L13-6 | L13-7 | L13-8 | L13-9 | L13-10 | L13-11 | L13-12 | L13-13 | L13-14 | L13-15 | L13-16 | L13-17 |
| 208 | L14-1 | L14-2 | L14-3 | L14-4 | L14-5 | L14-6 | L14-7 | L14-8 | L14-9 | L14-10 | L14-11 | L14-12 | L14-13 | L14-14 | L14-15 | L14-16 | L14-17 |
| 224 | L15-1 | L15-2 | L15-3 | L15-4 | L15-5 | L15-6 | L15-7 | L15-8 | L15-9 | L15-10 | L15-11 | L15-12 | L15-13 | L15-14 | L15-15 | L15-16 | L15-17 |
| 240 | L16-1 | L16-2 | L16-3 | L16-4 | L16-5 | L16-6 | L16-7 | L16-8 | L16-9 | L16-10 | L16-11 | L16-12 | L16-13 | L16-14 | L16-15 | L16-16 | L16-17 |
| 255 | L17-1 | L17-2 | L17-3 | L17-4 | L17-5 | L17-6 | L17-7 | L17-8 | L17-9 | L17-10 | L17-11 | L17-12 | L17-13 | L17-14 | L17-15 | L17-16 | L17-17 |

Fig. 6

LUTH

| | 0 | 16 | 32 | 48 | 64 | 80 | 96 | 112 | 128 | 144 | 160 | 176 | 192 | 208 | 224 | 240 | 255 |
|---|---|---|---|---|---|---|---|---|---|---|---|---|---|---|---|---|---|
| 0 | H1-1 | H1-2 | H1-3 | H1-4 | H1-5 | H1-6 | H1-7 | H1-8 | H1-9 | H1-10 | H1-11 | H1-12 | H1-13 | H1-14 | H1-15 | H1-16 | H1-17 |
| 16 | H2-1 | H2-2 | H2-3 | H2-4 | H2-5 | H2-6 | H2-7 | H2-8 | H2-9 | H2-10 | H2-11 | H2-12 | H2-13 | H2-14 | H2-15 | H2-16 | H2-17 |
| 32 | H3-1 | H3-2 | H3-3 | H3-4 | H3-5 | H3-6 | H3-7 | H3-8 | H3-9 | H3-10 | H3-11 | H3-12 | H3-13 | H3-14 | H3-15 | H3-16 | H3-17 |
| 48 | H4-1 | H4-2 | H4-3 | H4-4 | H4-5 | H4-6 | H4-7 | H4-8 | H4-9 | H4-10 | H4-11 | H4-12 | H4-13 | H4-14 | H4-15 | H4-16 | H4-17 |
| 64 | H5-1 | H5-2 | H5-3 | H5-4 | H5-5 | H5-6 | H5-7 | H5-8 | H5-9 | H5-10 | H5-11 | H5-12 | H5-13 | H5-14 | H5-15 | H5-16 | H5-17 |
| 80 | H6-1 | H6-2 | H6-3 | H6-4 | H6-5 | H6-6 | H6-7 | H6-8 | H6-9 | H6-10 | H6-11 | H6-12 | H6-13 | H6-14 | H6-15 | H6-16 | H6-17 |
| 96 | H7-1 | H7-2 | H7-3 | H7-4 | H7-5 | H7-6 | H7-7 | H7-8 | H7-9 | H7-10 | H7-11 | H7-12 | H7-13 | H7-14 | H7-15 | H7-16 | H7-17 |
| 112 | H8-1 | H8-2 | H8-3 | H8-4 | H8-5 | H8-6 | H8-7 | H8-8 | H8-9 | H8-10 | H8-11 | H8-12 | H8-13 | H8-14 | H8-15 | H8-16 | H8-17 |
| 128 | H9-1 | H9-2 | H9-3 | H9-4 | H9-5 | H9-6 | H9-7 | H9-8 | H9-9 | H9-10 | H9-11 | H9-12 | H9-13 | H9-14 | H9-15 | H9-16 | H9-17 |
| 144 | H10-1 | H10-2 | H10-3 | H10-4 | H10-5 | H10-6 | H10-7 | H10-8 | H10-9 | H10-10 | H10-11 | H10-12 | H10-13 | H10-14 | H10-15 | H10-16 | H10-17 |
| 160 | H11-1 | H11-2 | H11-3 | H11-4 | H11-5 | H11-6 | H11-7 | H11-8 | H11-9 | H11-10 | H11-11 | H11-12 | H11-13 | H11-14 | H11-15 | H11-16 | H11-17 |
| 176 | H12-1 | H12-2 | H12-3 | H12-4 | H12-5 | H12-6 | H12-7 | H12-8 | H12-9 | H12-10 | H12-11 | H12-12 | H12-13 | H12-14 | H12-15 | H12-16 | H12-17 |
| 192 | H13-1 | H13-2 | H13-3 | H13-4 | H13-5 | H13-6 | H13-7 | H13-8 | H13-9 | H13-10 | H13-11 | H13-12 | H13-13 | H13-14 | H13-15 | H13-16 | H13-17 |
| 208 | H14-1 | H14-2 | H14-3 | H14-4 | H14-5 | H14-6 | H14-7 | H14-8 | H14-9 | H14-10 | H14-11 | H14-12 | H14-13 | H14-14 | H14-15 | H14-16 | H14-17 |
| 224 | H15-1 | H15-2 | H15-3 | H15-4 | H15-5 | H15-6 | H15-7 | H15-8 | H15-9 | H15-10 | H15-11 | H15-12 | H15-13 | H15-14 | H15-15 | H15-16 | H15-17 |
| 240 | H16-1 | H16-2 | H16-3 | H16-4 | H16-5 | H16-6 | H16-7 | H16-8 | H16-9 | H16-10 | H16-11 | H16-12 | H16-13 | H16-14 | H16-15 | H16-16 | H16-17 |
| 255 | H17-1 | H17-2 | H17-3 | H17-4 | H17-5 | H17-6 | H17-7 | H17-8 | H17-9 | H17-10 | H17-11 | H17-12 | H17-13 | H17-14 | H17-15 | H17-16 | H17-17 |

Fig. 7

LUTD

| | 0 | 16 | 32 | 48 | 64 | 80 | 96 | 112 | 128 | 144 | 160 | 176 | 192 | 208 | 224 | 240 | 255 |
|---|---|---|---|---|---|---|---|---|---|---|---|---|---|---|---|---|---|
| 0 | D1-1 | D1-2 | D1-3 | D1-4 | D1-5 | D1-6 | D1-7 | D1-8 | D1-9 | D1-10 | D1-11 | D1-12 | D1-13 | D1-14 | D1-15 | D1-16 | D1-17 |
| 16 | D2-1 | D2-2 | D2-3 | D2-4 | D2-5 | D2-6 | D2-7 | D2-8 | D2-9 | D2-10 | D2-11 | D2-12 | D2-13 | D2-14 | D2-15 | D2-16 | D2-17 |
| 32 | D3-1 | D3-2 | D3-3 | D3-4 | D3-5 | D3-6 | D3-7 | D3-8 | D3-9 | D3-10 | D3-11 | D3-12 | D3-13 | D3-14 | D3-15 | D3-16 | D3-17 |
| 48 | D4-1 | D4-2 | D4-3 | D4-4 | D4-5 | D4-6 | D4-7 | D4-8 | D4-9 | D4-10 | D4-11 | D4-12 | D4-13 | D4-14 | D4-15 | D4-16 | D4-17 |
| 64 | D5-1 | D5-2 | D5-3 | D5-4 | D5-5 | D5-6 | D5-7 | D5-8 | D5-9 | D5-10 | D5-11 | D5-12 | D5-13 | D5-14 | D5-15 | D5-16 | D5-17 |
| 80 | D6-1 | D6-2 | D6-3 | D6-4 | D6-5 | D6-6 | D6-7 | D6-8 | D6-9 | D6-10 | D6-11 | D6-12 | D6-13 | D6-14 | D6-15 | D6-16 | D6-17 |
| 96 | D7-1 | D7-2 | D7-3 | D7-4 | D7-5 | D7-6 | D7-7 | D7-8 | D7-9 | D7-10 | D7-11 | D7-12 | D7-13 | D7-14 | D7-15 | D7-16 | D7-17 |
| 112 | D8-1 | D8-2 | D8-3 | D8-4 | D8-5 | D8-6 | D8-7 | D8-8 | D8-9 | D8-10 | D8-11 | D8-12 | D8-13 | D8-14 | D8-15 | D8-16 | D8-17 |
| 128 | D9-1 | D9-2 | D9-3 | D9-4 | D9-5 | D9-6 | D9-7 | D9-8 | D9-9 | D9-10 | D9-11 | D9-12 | D9-13 | D9-14 | D9-15 | D9-16 | D9-17 |
| 144 | D10-1 | D10-2 | D10-3 | D10-4 | D10-5 | D10-6 | D10-7 | D10-8 | D10-9 | D10-10 | D10-11 | D10-12 | D10-13 | D10-14 | D10-15 | D10-16 | D10-17 |
| 160 | D11-1 | D11-2 | D11-3 | D11-4 | D11-5 | D11-6 | D11-7 | D11-8 | D11-9 | D11-10 | D11-11 | D11-12 | D11-13 | D11-14 | D11-15 | D11-16 | D11-17 |
| 176 | D12-1 | D12-2 | D12-3 | D12-4 | D12-5 | D12-6 | D12-7 | D12-8 | D12-9 | D12-10 | D12-11 | D12-12 | D12-13 | D12-14 | D12-15 | D12-16 | D12-17 |
| 192 | D13-1 | D13-2 | D13-3 | D13-4 | D13-5 | D13-6 | D13-7 | D13-8 | D13-9 | D13-10 | D13-11 | D13-12 | D13-13 | D13-14 | D13-15 | D13-16 | D13-17 |
| 208 | D14-1 | D14-2 | D14-3 | D14-4 | D14-5 | D14-6 | D14-7 | D14-8 | D14-9 | D14-10 | D14-11 | D14-12 | D14-13 | D14-14 | D14-15 | D14-16 | D14-17 |
| 224 | D15-1 | D15-2 | D15-3 | D15-4 | D15-5 | D15-6 | D15-7 | D15-8 | D15-9 | D15-10 | D15-11 | D15-12 | D15-13 | D15-14 | D15-15 | D15-16 | D15-17 |
| 240 | D16-1 | D16-2 | D16-3 | D16-4 | D16-5 | D16-6 | D16-7 | D16-8 | D16-9 | D16-10 | D16-11 | D16-12 | D16-13 | D16-14 | D16-15 | D16-16 | D16-17 |
| 255 | D17-1 | D17-2 | D17-3 | D17-4 | D17-5 | D17-6 | D17-7 | D17-8 | D17-9 | D17-10 | D17-11 | D17-12 | D17-13 | D17-14 | D17-15 | D17-16 | D17-17 |

Fig. 8

LUTZ

| | 0 | 16 | 32 | 48 | 64 | 80 | 96 | 112 | 128 | 144 | 160 | 176 | 192 | 208 | 224 | 240 | 255 |
|---|---|---|---|---|---|---|---|---|---|---|---|---|---|---|---|---|---|
| 0 | Z1-1 | Z1-2 | Z1-3 | Z1-4 | Z1-5 | Z1-6 | Z1-7 | Z1-8 | Z1-9 | Z1-10 | Z1-11 | Z1-12 | Z1-13 | Z1-14 | Z1-15 | Z1-16 | Z1-17 |
| 16 | Z2-1 | Z2-2 | Z2-3 | Z2-4 | Z2-5 | Z2-6 | Z2-7 | Z2-8 | Z2-9 | Z2-10 | Z2-11 | Z2-12 | Z2-13 | Z2-14 | Z2-15 | Z2-16 | Z2-17 |
| 32 | Z3-1 | Z3-2 | Z3-3 | Z3-4 | Z3-5 | Z3-6 | Z3-7 | Z3-8 | Z3-9 | Z3-10 | Z3-11 | Z3-12 | Z3-13 | Z3-14 | Z3-15 | Z3-16 | Z3-17 |
| 48 | Z4-1 | Z4-2 | Z4-3 | Z4-4 | Z4-5 | Z4-6 | Z4-7 | Z4-8 | Z4-9 | Z4-10 | Z4-11 | Z4-12 | Z4-13 | Z4-14 | Z4-15 | Z4-16 | Z4-17 |
| 64 | Z5-1 | Z5-2 | Z5-3 | Z5-4 | Z5-5 | Z5-6 | Z5-7 | Z5-8 | Z5-9 | Z5-10 | Z5-11 | Z5-12 | Z5-13 | Z5-14 | Z5-15 | Z5-16 | Z5-17 |
| 80 | Z6-1 | Z6-2 | Z6-3 | Z6-4 | Z6-5 | Z6-6 | Z6-7 | Z6-8 | Z6-9 | Z6-10 | Z6-11 | Z6-12 | Z6-13 | Z6-14 | Z6-15 | Z6-16 | Z6-17 |
| 96 | Z7-1 | Z7-2 | Z7-3 | Z7-4 | Z7-5 | Z7-6 | Z7-7 | Z7-8 | Z7-9 | Z7-10 | Z7-11 | Z7-12 | Z7-13 | Z7-14 | Z7-15 | Z7-16 | Z7-17 |
| 112 | Z8-1 | Z8-2 | Z8-3 | Z8-4 | Z8-5 | Z8-6 | Z8-7 | Z8-8 | Z8-9 | Z8-10 | Z8-11 | Z8-12 | Z8-13 | Z8-14 | Z8-15 | Z8-16 | Z8-17 |
| 128 | Z9-1 | Z9-2 | Z9-3 | Z9-4 | Z9-5 | Z9-6 | Z9-7 | Z9-8 | Z9-9 | Z9-10 | Z9-11 | Z9-12 | Z9-13 | Z9-14 | Z9-15 | Z9-16 | Z9-17 |
| 144 | Z10-1 | Z10-2 | Z10-3 | Z10-4 | Z10-5 | Z10-6 | Z10-7 | Z10-8 | Z10-9 | Z10-10 | Z10-11 | Z10-12 | Z10-13 | Z10-14 | Z10-15 | Z10-16 | Z10-17 |
| 160 | Z11-1 | Z11-2 | Z11-3 | Z11-4 | Z11-5 | Z11-6 | Z11-7 | Z11-8 | Z11-9 | Z11-10 | Z11-11 | Z11-12 | Z11-13 | Z11-14 | Z11-15 | Z11-16 | Z11-17 |
| 176 | Z12-1 | Z12-2 | Z12-3 | Z12-4 | Z12-5 | Z12-6 | Z12-7 | Z12-8 | Z12-9 | Z12-10 | Z12-11 | Z12-12 | Z12-13 | Z12-14 | Z12-15 | Z12-16 | Z12-17 |
| 192 | Z13-1 | Z13-2 | Z13-3 | Z13-4 | Z13-5 | Z13-6 | Z13-7 | Z13-8 | Z13-9 | Z13-10 | Z13-11 | Z13-12 | Z13-13 | Z13-14 | Z13-15 | Z13-16 | Z13-17 |
| 208 | Z14-1 | Z14-2 | Z14-3 | Z14-4 | Z14-5 | Z14-6 | Z14-7 | Z14-8 | Z14-9 | Z14-10 | Z14-11 | Z14-12 | Z14-13 | Z14-14 | Z14-15 | Z14-16 | Z14-17 |
| 224 | Z15-1 | Z15-2 | Z15-3 | Z15-4 | Z15-5 | Z15-6 | Z15-7 | Z15-8 | Z15-9 | Z15-10 | Z15-11 | Z15-12 | Z15-13 | Z15-14 | Z15-15 | Z15-16 | Z15-17 |
| 240 | Z16-1 | Z16-2 | Z16-3 | Z16-4 | Z16-5 | Z16-6 | Z16-7 | Z16-8 | Z16-9 | Z16-10 | Z16-11 | Z16-12 | Z16-13 | Z16-14 | Z16-15 | Z16-16 | Z16-17 |
| 255 | Z17-1 | Z17-2 | Z17-3 | Z17-4 | Z17-5 | Z17-6 | Z17-7 | Z17-8 | Z17-9 | Z17-10 | Z17-11 | Z17-12 | Z17-13 | Z17-14 | Z17-15 | Z17-16 | Z17-17 |

Fig. 12

DRIVE METHOD OF DISPLAY PANEL AND DISPLAY APPARATUS

CROSS-REFERENCE TO RELATED APPLICATIONS

This application is a National Stage of International Application No. PCT/CN2022/087147, filed Apr. 15, 2022, which is hereby incorporated by reference in its entirety.

FIELD

The present disclosure relates to the technical field of display, in particular to a drive method of a display panel and a display apparatus.

BACKGROUND

Displays such as a liquid crystal display (LCD) and an organic light-emitting diode (OLED) display generally include a plurality of pixel units. Each pixel unit may include: a plurality of sub-pixels with different colors. Brightness corresponding to each sub-pixel is controlled so as to blend colors to be displayed to display color images.

SUMMARY

An embodiment of the present disclosure provides a drive method of a display panel, including: obtaining a current temperature of the display panel; obtaining a current overdrive lookup table corresponding to the current temperature by calculation according to the current temperature and initial overdrive lookup tables corresponding to prestored set temperatures, wherein the initial overdrive lookup tables include a plurality of different first gray-scale values, a plurality of different second gray-scale values and initial gray-scale values corresponding to any first gray-scale value and any second gray-scale value, and the current overdrive lookup table includes a plurality of different first gray-scale values, a plurality of different second gray-scale values and current gray-scale values corresponding to any first gray-scale value and any second gray-scale value; and driving sub-pixels in the display panel to charge corresponding data voltages according to the current overdrive lookup table.

In some embodiments, a quantity of the set temperatures is M, M is an integer, and M≥2.

In some embodiments, obtaining the current overdrive lookup table corresponding to the current temperature by the calculation according to the current temperature and the initial overdrive lookup tables corresponding to the prestored set temperatures includes: obtaining the current overdrive lookup table corresponding to the current temperature by the calculation according to the current temperature and the initial overdrive lookup tables corresponding to the prestored set temperatures when the current temperature is different from the M set temperatures.

In some embodiments, obtaining the current overdrive lookup table corresponding to the current temperature by the calculation according to the current temperature and the initial overdrive lookup tables corresponding to the prestored set temperatures includes: calling an initial overdrive lookup table corresponding to an $m^{th}$ set temperature and an initial overdrive lookup table corresponding to an $m+1^{th}$ set temperature in the initial overdrive lookup tables corresponding to the M set temperatures according to the current temperature, wherein the $m^{th}$ set temperature is less than the current temperature, the $m+1^{th}$ set temperature is greater than the current temperature, m is an integer, and 1≤m≤M−1; and obtaining each current gray-scale value in the current overdrive lookup table corresponding to the current temperature by the calculation according to the current temperature, the initial overdrive lookup table corresponding to the $m^{th}$ set temperature and the initial overdrive lookup table corresponding to the $m+1^{th}$ set temperature.

In some embodiments, obtaining each current gray-scale value in the current overdrive lookup table corresponding to the current temperature by the calculation according to the current temperature, the initial overdrive lookup table corresponding to the $m^{h}$ Set temperature and the initial overdrive lookup table corresponding to the $m+1^{th}$ set temperature includes: determining a first initial gray-scale value in the initial overdrive lookup table corresponding to the $m^{th}$ set temperature and a second initial gray-scale value in the initial overdrive lookup table corresponding to the $m+1^{th}$ set temperature based on a principle of the same first gray-scale value and the same second gray-scale value; and determining a current gray-scale value corresponding to the first initial gray-scale value and the second initial gray-scale value in the current overdrive lookup table according to the current temperature, the $m^{th}$ set temperature, the $m+1^{th}$ set temperature, the first initial gray-scale value and the second initial gray-scale value.

In some embodiments, determining the current gray-scale value corresponding to the first initial gray-scale value and the second initial gray-scale value in the current overdrive lookup table according to the current temperature, the $m^{th}$ set temperature, the $m+1^{t}$ set temperature, the first initial gray-scale value and the second initial gray-scale value includes: obtaining a computational formula related to the temperature by fitting according to the $m^{th}$ set temperature, the $m+1^{th}$ set temperature, the first initial gray-scale value and the second initial gray-scale value; and determining the current gray-scale value corresponding to the first initial gray-scale value and the second initial gray-scale value in the current overdrive lookup table according to the current temperature and the computational formula.

In some embodiments, determining the current gray-scale value corresponding to the first initial gray-scale value and the second initial gray-scale value in the current overdrive lookup table according to the current temperature and the computational formula includes: determining a middle gray-scale value corresponding to the first initial gray-scale value and the second initial gray-scale value in the current overdrive lookup table according to the current temperature and the computational formula; determining the middle gray-scale value as the current gray-scale value when it is determined that the middle gray-scale value is not less than a minimum endpoint gray-scale value and not greater than a maximum endpoint gray-scale value; determining the minimum endpoint gray-scale value as the current gray-scale value when it is determined that the middle gray-scale value is less than the minimum endpoint gray-scale value; and determining the maximum endpoint gray-scale value as the current gray-scale value when it is determined that the middle gray-scale value is greater than the maximum endpoint gray-scale value.

In some embodiments, the computational formula is:

$$D_{a-b} = A_{a-b}t^2 + B_{a-b}t + C_{a-b};$$

wherein $D_{a-b}$ represents the middle gray-scale value corresponding to the first initial gray-scale value and the second initial gray-scale value determined based on the principle of the same first gray-scale value and the same second gray-scale value, t represents the current temperature, $A_{a-b}$, $B_{a-b}$, and $C_{a-b}$ respectively represent fitting parameters corresponding to the first initial gray-scale value and the second initial gray-scale value determined based on the principle of the same first gray-scale value and the same second gray-scale value, a represents the first initial gray-scale value determined based on the principle of the same first gray-scale value and the same second gray-scale value, and b represents the second initial gray-scale value determined based on the principle of the same first gray-scale value and the same second gray-scale value.

In some embodiments, the $m^{th}$ set temperature is the set temperature less than and closest to the current temperature; and the $m+1^{th}$ set temperature is the set temperature greater than and closest to the current temperature.

In some embodiments, $M \leq 3$.

In some embodiments, when the current temperature is the same as one set temperature in the M set temperatures, the initial overdrive lookup table corresponding to the set temperature the same as the current temperature in the M set temperatures is called according to the current temperature; and the sub-pixels in the display panel are driven to charge the corresponding data voltages according to the called initial overdrive lookup table.

An embodiment of the present disclosure provides a display apparatus, including: a display panel; a memory, configured to store initial overdrive lookup tables corresponding to set temperatures; a temperature collector, configured to detect a temperature of the display panel; and a time sequence controller, configured to obtain the current temperature of the display panel detected by the temperature collector, obtain a current overdrive lookup table corresponding to the current temperature by calculation according to the current temperature and the initial overdrive lookup tables corresponding to the prestored set temperatures, and drive sub-pixels in the display panel to charge corresponding data voltages according to the current overdrive lookup table, wherein the initial overdrive lookup tables include a plurality of different first gray-scale values, a plurality of different second gray-scale values and initial gray-scale values corresponding to any first gray-scale value and any second gray-scale value, and the current overdrive lookup table includes a plurality of different first gray-scale values, a plurality of different second gray-scale values and current gray-scale values corresponding to any first gray-scale value and any second gray-scale value.

In some embodiments, the time sequence controller is further configured to directly collect the temperature of the display panel detected by the temperature collector from the temperature collector, and obtain the current temperature according to the collected temperature.

In some embodiments, the display apparatus further includes a system controller; the system controller is configured to directly collect the temperature of the display panel detected by the temperature collector from the temperature collector, and send the collected temperature to the time sequence controller; and the time sequence controller is further configured to obtain the current temperature according to the received temperature.

In some embodiments, at least one temperature collector is arranged, and the temperature collector is arranged in a non-display region of the display panel.

In some embodiments, when at least two temperature collectors are arranged, the temperature collectors are arranged in the non-display region in a disperse mode, and the current temperature is an average value of temperatures detected by the temperature collectors; and when at least one temperature collector is arranged, the current temperature is the temperature detected by the temperature collector.

In some embodiments, the temperature collector includes at least one of a temperature sensor and a thermistor.

BRIEF DESCRIPTION OF THE DRAWINGS

FIG. 6 is a schematic diagram of some initial overdrive lookup tables provided by an embodiment of the present disclosure.

FIG. 7 is a schematic diagram of some other initial overdrive lookup tables provided by an embodiment of the present disclosure.

FIG. 8 is a schematic diagram of some current overdrive lookup tables provided by an embodiment of the present disclosure.

FIG. 12 is a schematic diagram of yet some initial overdrive lookup tables provided by an embodiment of the present disclosure.

DETAILED DESCRIPTION OF THE EMBODIMENTS

Figure 1:
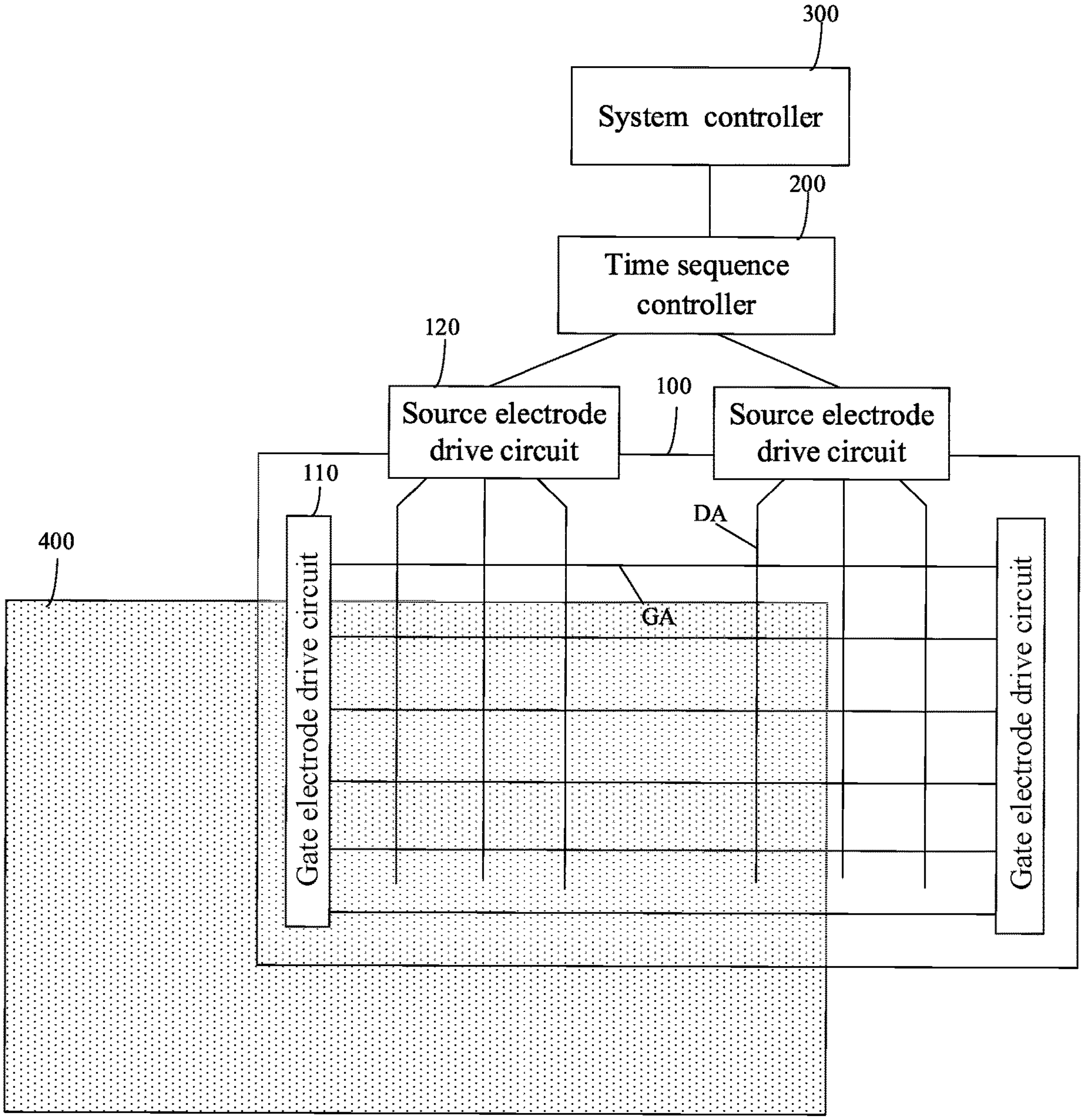
FIG. 1 is some schematic structural diagrams of a display apparatus provided by an embodiment of the present disclosure.

To make the objectives, technical solutions and advantages of embodiments of the present disclosure clearer, the technical solutions of the embodiments of the present disclosure will be clearly and completely described below in conjunction with the accompanying drawings of the embodiments of the present disclosure. Apparently, the embodiments described here are a part of the embodiments of the present disclosure, not all of them. In addition, the embodiments in the present disclosure and features in the embodiments may be combined with each other without conflict. Based on the embodiments described in the present disclosure, all other embodiments acquired by those ordinarily skilled in the art without creative labor fall within the scope of protection of the present disclosure.

Unless otherwise defined, technical or scientific terms used herein shall have the ordinary meanings understood by those ordinarily skilled in the art to which the present disclosure pertains. “First”, “second” and similar words used in the present disclosure do not indicate any order, quantity or importance, but are only used to distinguish different components. “Comprise” or “include” or other similar words indicate that an element or item appearing before such words covers listed elements or items appearing after the words and equivalents thereof, and do not exclude other elements or items. “Link” or “connect” or other similar words are not limited to physical or mechanical connection, but may include electric connection, no matter direct connection or indirect connection.

It should be noted that sizes and shapes of figures in the accompanying drawings do not reflect a true scale, and are only intended to illustrate the content of the present disclosure. The same or similar reference numerals indicate the same or similar components or components having the same or similar functions all the time.

As shown in combination with FIG. 1 to FIG. 3A, a display apparatus may include: a display panel 100, a time sequence controller 200, a system controller 300 and a backlight module 400. The display panel 100 may have a display region AA and a non-display region BB. The display region AA may include a plurality of pixel units arranged in array, a plurality of grid lines GA (for example, GA1, GA2, GA3 and GA4) and a plurality of data lines DA (for example, DA1, DA2 and DA3). As an example, each pixel unit includes a plurality of sub-pixels SPXs. For example, each pixel unit may include a red sub-pixel, a green sub-pixel and a blue sub-pixel, so that red, green and blue are blended to achieve color display. Or, each pixel unit may also include a red sub-pixel, a green sub-pixel, a blue sub-pixel and a white sub-pixel, so that red, green, blue and white are blended to achieve color display. Certainly, in an actual application, colors emitted by the sub-pixels in the pixel units may be designed and determined according to an actual application environment, which is not limited here.

Figure 2:
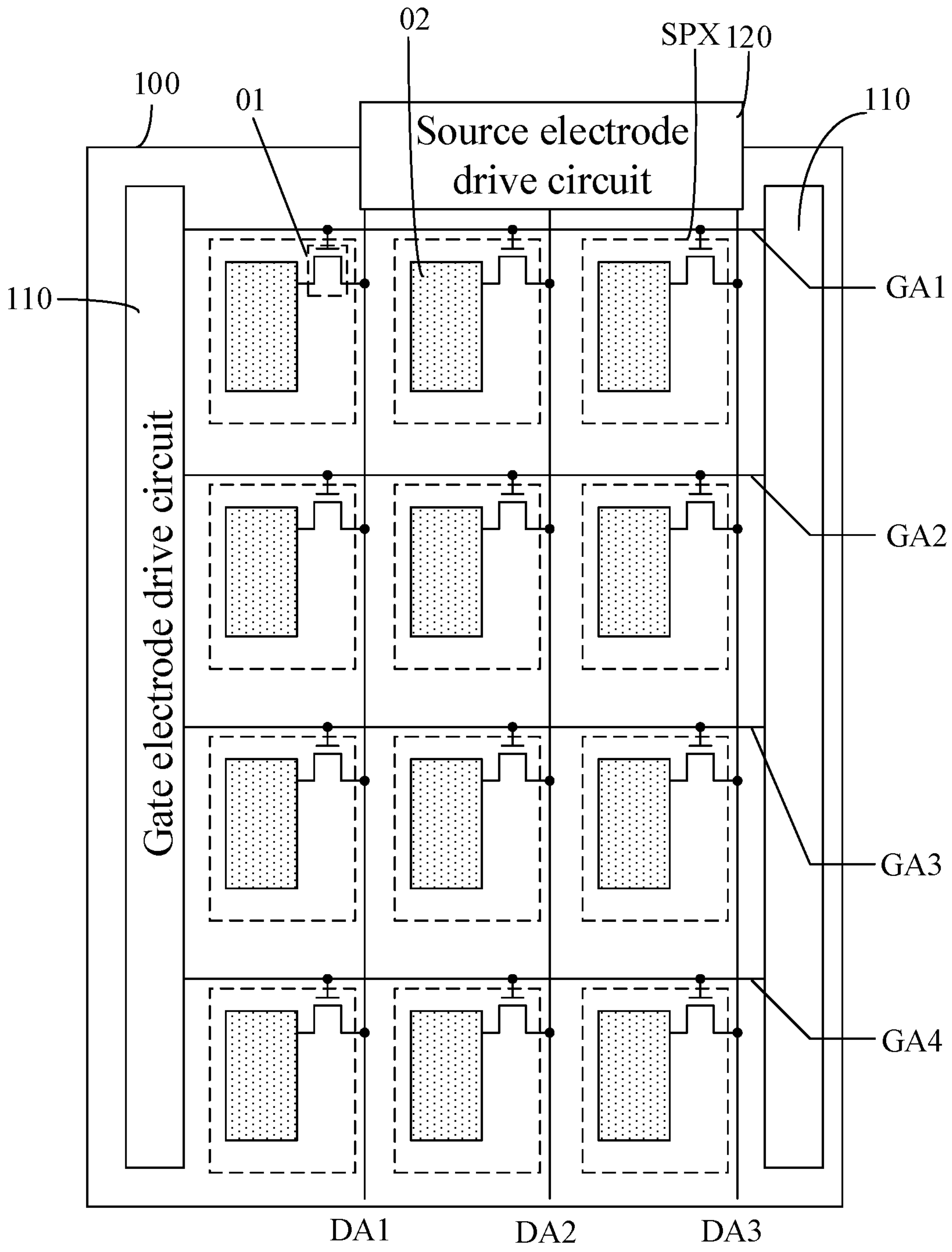
FIG. 2 is some schematic structural diagrams of a display panel provided by an embodiment of the present disclosure.

As shown with reference to FIG. 2, each sub-pixel SPX may include a transistor 01 and a pixel electrode 02, wherein one row of sub-pixels SPXs corresponds to one grid line, and one column of sub-pixels SPXs corresponds to one data line. A gate electrode of the transistor 01 is electrically connected with the corresponding grid line, a source electrode of the transistor 01 is electrically connected with the corresponding data line, and a drain electrode of the transistor 01 is electrically connected with the pixel electrode 02. It should be illustrated that a pixel array structure of the present disclosure may also be a double-gate structure, that is, two gate lines are arranged between two adjacent rows of pixels, the arrangement mode may reduce the data lines in half, that is, the data lines between two adjacent columns of pixels are included, in some cases, the data lines are not included between the two adjacent columns of pixels, and a specific pixel arrangement structure and the arrangement mode of the data lines and scanning lines are not limited.

As shown in combination with FIG. 1 to FIG. 3C, the non-display region BB may include a gate electrode drive circuit 110 and a source electrode drive circuit 120. The gate electrode drive circuit 110 is respectively coupled with the grid lines GA1, GA2, GA3 and GA4, and the source electrode drive circuit 120 is respectively coupled with the data lines DA1, DA2 and DA3. As an example, two source electrode drive circuits 120 may be arranged, one source electrode drive circuit 120 is connected with half of data lines, and the other source electrode drive circuit 120 is connected with the other half of data lines. Certainly, three, four or more source electrode drive circuits 120 may be arranged, which may be designed and determined according to needs of the actual application, which is not limited here.

Figure 3A:
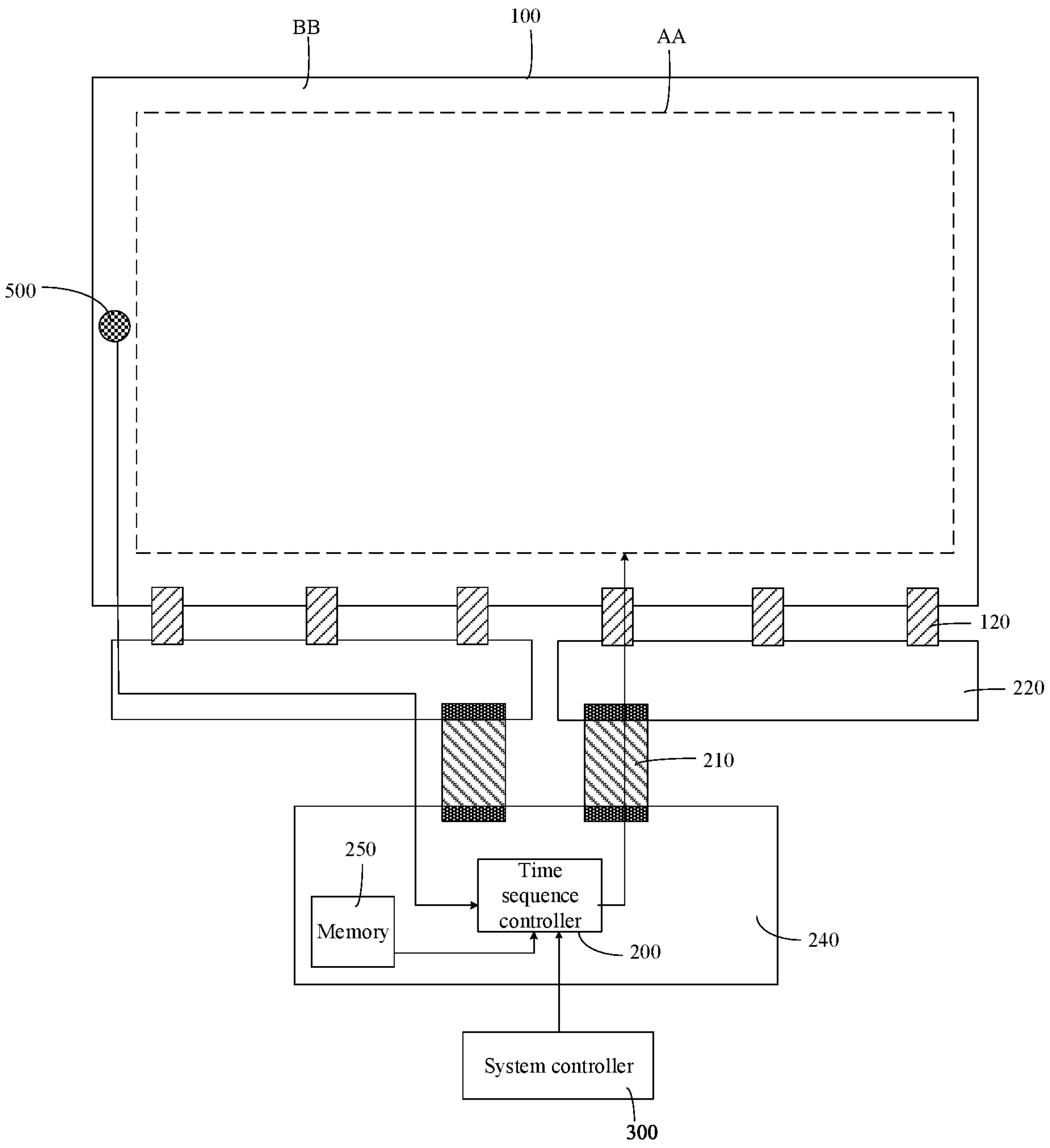
FIG. 3A is some other schematic structural diagrams of a display apparatus provided by an embodiment of the present disclosure.
Figure 3B:
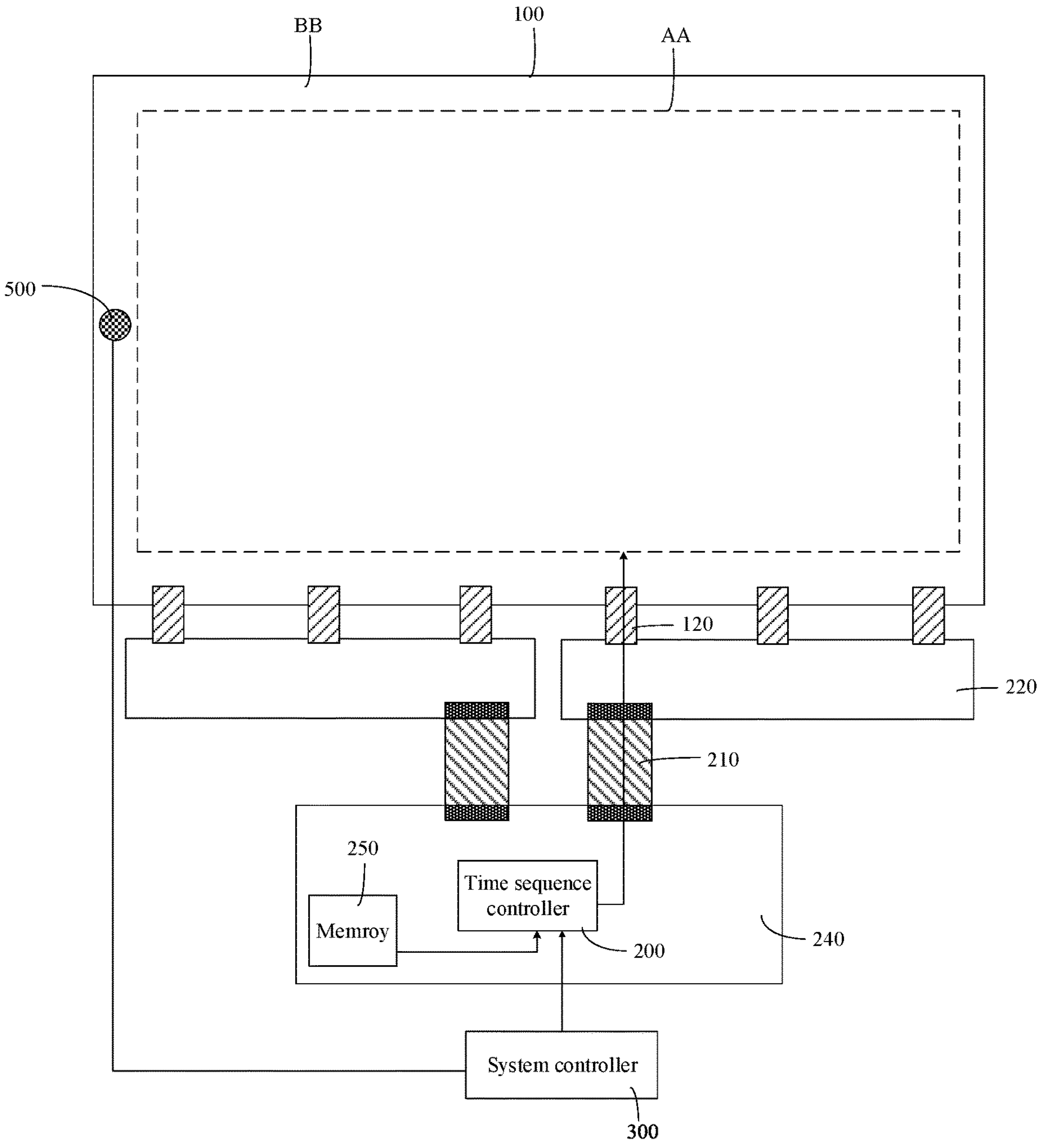
FIG. 3B is yet some schematic structural diagrams of a display apparatus provided by an embodiment of the present disclosure.

In some embodiments of the present disclosure, as shown in FIG. 3A and FIG. 3B, a connection relation between the time sequence controller 200 and the display panel is given, wherein 300 represents the system controller 300, 200 represents the time sequence controller 200, 210 represents a printed circuit board (PCB)(for example, XPCB) able to transmit display data, 220 represents a chip on film (COF), 120 represents the source electrode drive circuit, and 240 represents a time sequence circuit board where the time sequence controller 200 is located. As an example, the system controller 300 may receive display data of a to-be-displayed image of one display frame, and then send the display data to the time sequence controller 200. The time sequence controller 200 may input a clock control signal into the gate electrode drive circuit 110 through a level shift circuit, so as to enable the gate electrode drive circuit 110 to output a gate electrode scanning signal to the grid lines, so that the grid lines GA1, GA2, GA3 and GA4 are driven. Moreover, the time sequence controller 200 may further perform corresponding processing on the received display data, and send the data to the source electrode drive circuit 120 after corresponding processing. The source electrode drive circuit 120 may input data voltages to the data lines DA1, DA2 and DA3 according to the received display data, so that the sub-pixels SPXs are charged to cause the sub-pixels SPXs to input corresponding data voltages, and an image display function of the display frame is achieved. As an example, the time sequence controller 200 may input the display data into the source electrode drive circuit 120 through the PCB 210 and the COF 220. The source electrode drive circuit 120 loads the data voltages to the data lines in the display panel according to the display data.

As an example, the system controller 300 may be set as a system on chip (SOC). Certainly, in an actual application, an implementation of the system controller 300 may be determined according to needs of the actual application, which is not limited here.

It should be illustrated that the display panel in the embodiment of the present disclosure may be a liquid crystal display panel all the time. As an example, the liquid crystal display panel generally includes an array substrate and an opposite substrate which are box-to-box and liquid crystal molecules packaged between the array substrate and the opposite substrate. During image display, since a voltage difference exists between the data voltages loaded on the pixel electrodes of the sub-pixels SPXs and a common electrode voltage loaded on a common electrode and may form an electric field, the liquid crystal molecules deflect under the effect of the electric field. Since the electric field with different intensities causes the deflection degree of the liquid crystal molecules to be different, transmittances of the sub-pixels SPXs are different, so that the sub-pixels SPXs achieve brightness with different gray-scales, and therefore image display is achieved.

A gray-scale generally divides brightness between darkest brightness and brightest brightness into several parts, so as to facilitate screen brightness management. For example, a display image is composed of three colors of red, green and blue, wherein each color may show different brightness levels, red, green and blue with the different brightness levels are combined to be able to form different colors. For example, the digit of the gray-scale of the liquid crystal display panel is 6 bit, the red, green and blue respectively have 64 (that is $2^6$) gray-scales, and 64 gray-scale values are respectively 0~63. The digit of the gray-scale of the liquid crystal display panel is 8 bit, the red, green and blue respectively have 256 (that is $2^8$) gray-scales, and 256 gray-scale values are respectively 0~255. The digit of the gray-scale of the liquid crystal display panel is 10 bit, the red, green and blue respectively have 1024 (that is $2^{10}$) gray-scales, and 1024 gray-scale values are respectively 0~1023. The digit of the gray-scale of the liquid crystal display panel is 12 bit, the red, green and blue respectively have 4096 (that is $2^{12}$) gray-scales, and 4096 gray-scale values are respectively 0~4093.

As an example, taking one sub-pixel SPX as an example, Vcom represents a common electrode voltage. When the input data voltage in the pixel electrode of the sub-pixel SPX is greater than the common electrode voltage Vcom, the liquid crystal molecules at the sub-pixel SPX can be made to be positively polar, and corresponding polarity of the data voltage in the sub-pixel SPX is positive. When the input data voltage in the pixel electrode of the sub-pixel SPX is less than the common electrode voltage Vcom, the liquid crystal molecules at the sub-pixel SPX may be negatively polar, and then the corresponding polarity of the data voltage in the sub-pixel SPX is negative. For example, the common electrode voltage may be 8.3V, if data voltage of 8.3V~16V is input into the pixel electrode of the sub-pixel SPX, the liquid crystal molecules at the sub-pixel SPX may be positively polar, and the data voltage of 8.3V~16V is the data voltage corresponding to the positive polarity. If data voltage of 0.6V~8.3V is input into the pixel electrode of the sub-pixel SPX, the liquid crystal molecules at the sub-pixel SPX may be negatively polar, and then the data voltage of 0.6V~8.3V is the data voltage corresponding to negative polarity. As an example, taking 0~255 gray-scales of 8 bit as an example, if data voltage of 16V is input into the pixel electrode of the sub-pixel SPX, the sub-pixel SPX may correspond to brightness of a maximum gray-scale value of positive polarity. If a data voltage of 0.6V is input into the pixel electrode of the sub-pixel SPX, the sub-pixel SPX may correspond to brightness of a maximum gray-scale value of negative polarity.

Figure 4:
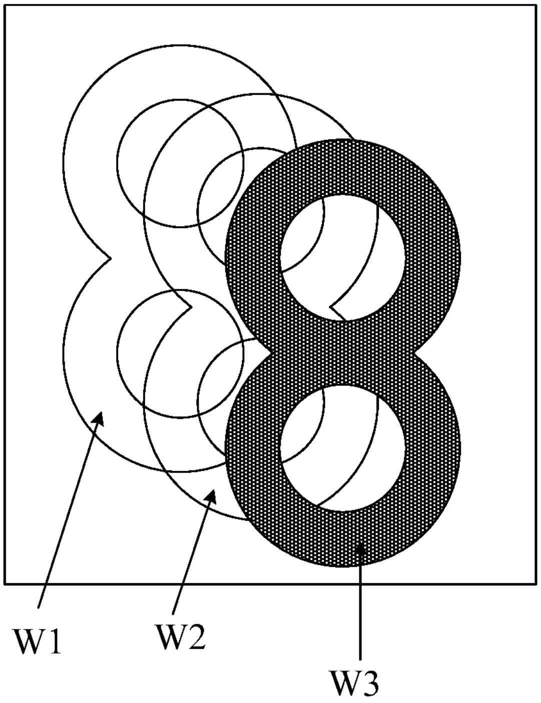
FIG. 4 is some schematic diagrams provided by an embodiment of the present disclosure.

Generally, response time is a specific performance index of the liquid crystal display panel. The response time refers to a reaction speed of each sub-pixel of the liquid crystal display panel to the input data voltage, that is, the time needed by the sub-pixel converting from darkness to brightness or converting from brightness to darkness. The shorter the response time, the less the trailing that a user will feel when looking at a motion image. Compared with a positive liquid crystal, a negative liquid crystal has a higher transmittance characteristic, which may obviously improve the brightness, sharpness and contrast of the liquid crystal display panel, so as to achieve whole improvement of image quality. However, the negative liquid crystal also has a natural defect, such as high rotary viscosity, and consequently the response time of the negative liquid crystal under the same condition is insufficient, and poor trailing is prone to appearing during motion image playing, as shown in FIG. 4. As shown in combination with FIG. 4, taking the display panel with the gray-scale digit of 8 bit as an example, when the display panel displays a test image with 255 gray-scales as a background and 0 gray-scale as a number 8, a number 8 corresponding to W1 is the position of a number 8 in an image of a first display frame, W2 is the position of a number 8 in an image of a second display frame, and W3 is the position of a number 8 in an image of a third display frame. It can be known from FIG. 4 that when the number 8 corresponding to W3 is displayed in the third display frame, some residual images will appear in the number 8 corresponding to W1 and the number 8 corresponding to W2, which forms trailing.

Poor trailing caused by the high rotary viscosity may be optimized through circuit over drive (OD). However, since the rotation speed of the negative liquid crystal is greatly affected by the temperature, the lower the temperature, the lower the deflection speed, resulting in poor color inverting of the motion image caused by over drive if the temperature of the liquid display panel slightly rises when an OD lookup table debugged at the normal temperature is adopted to drive the liquid crystal display panel to display the image, and therefore, the effect of temperature on the response time still cannot be ignored.

To reduce the effect of the temperature on the response time, an embodiment of the present disclosure provides a drive method of a display panel, which can obtain a current temperature of the display panel, and then obtain a new current overdrive lookup table corresponding to the current temperature by calculation according to the obtained current temperature and initial overdrive lookup tables corresponding to prestored set temperatures. In other words, a current gray-scale value is obtained by calculation according to the current temperature and an initial gray-scale value, so that the current overdrive lookup table is different from the initial overdrive lookup tables. Therefore, the overdrive lookup tables may be dynamically adjusted according to the current temperature of the display panel, so as to drive the display panel to perform display through the adjusted current overdrive lookup table, which may solve the problem of poor color inverting of the motion image. So, excessive initial overdrive lookup tables do not need to be stored, so as to reduce space occupied by storage, reduce reading time in an actual operation process and increase the reading speed.

Figure 5:
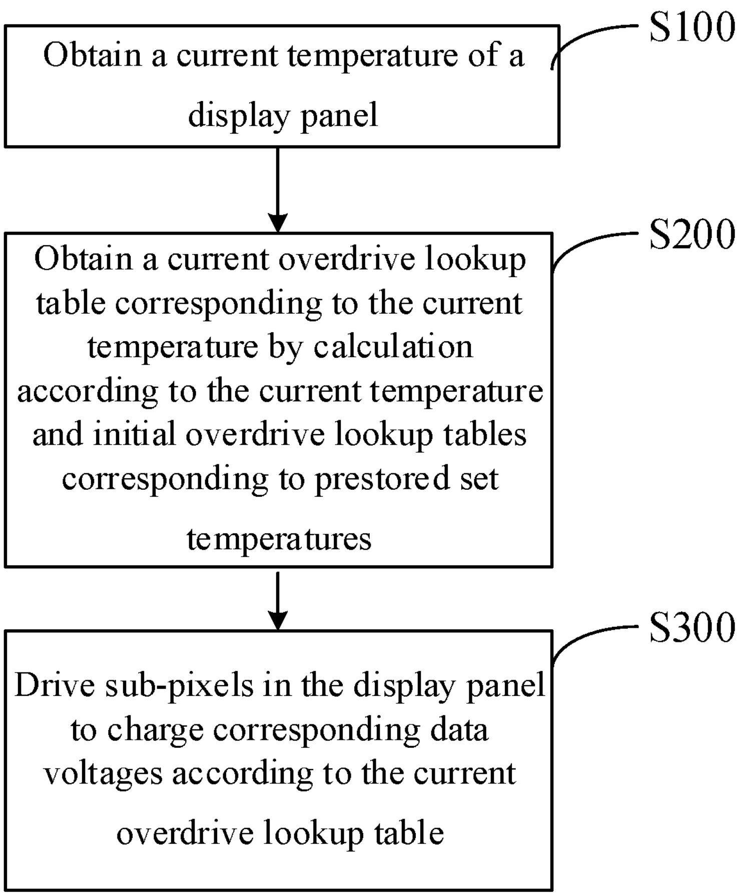
FIG. 5 is some flow diagrams of a drive method of a display panel provided by an embodiment of the present disclosure.

As shown in combination with FIG. 5, a drive method of a display panel provided by an embodiment of the present disclosure may include following steps.

S100, a current temperature of the display panel is obtained.

In some embodiments of the present disclosure, as shown in FIG. 3A, the display apparatus may further include a temperature collector 500. The temperature collector 500 may detect the temperature of the display panel. As an example, the temperature collector 500 may perform work of detecting the temperature of the display panel after every set time. For example, the temperature collector 500 may perform work of detecting the temperature of the display panel after every 10 min, 30 min, 1 h, 10 h or 24 h, etc.

As an example, the temperature collector 500 may be arranged in a non-display region BB of the display panel, which may prevent the temperature collector 500 from occupying the area of a display region and avoid the effect of the temperature collector 500 on the display effect of the display region. As an example, the temperature collector 500 is arranged on an opposite substrate of the display panel and is arranged between the opposite substrate and a backlight module, which may further be prevented from occupying the area of the display region. Preferably, the temperature collector may also be arranged between an array substrate and the opposite substrate. For example, for liquid crystal display, the temperature collector may be arranged in a liquid crystal box formed by the array substrate and the opposite substrate, for example, the temperature collector may be arranged on one side of the array substrate close to the opposite substrate, which is not limited here.

In some embodiments of the present disclosure, a time sequence controller 200 may directly collect the temperature of the display panel detected by the temperature collector 500 from the temperature collector 500, and obtain the current temperature according to the collected temperature. As an example, as shown in combination with FIG. 3A, the temperature of the display panel detected by the temperature collector 500 may be directly transmitted to the time sequence controller 200 so as to cause the time sequence controller 200 to be able to obtain the current temperature according to the received temperature. Therefore, the time sequence controller 200 may directly take the temperature of the display panel detected by the temperature collector 500 as the obtained current temperature, which may be achieved by additionally arranging a temperature control feedback pin on a conventional COF 220 and a conventional PCB 210.

In some embodiments of the present disclosure, a system controller 300 may directly collect the temperature of the display panel detected by the temperature collector 500 from the temperature collector 500 and send the collected temperature to the time sequence controller 200. The time sequence controller 200 obtains the current temperature according to the received temperature. As an example, as shown in combination with FIG. 3B, a signal port wire (for example, a general-purpose input/output port (GPIO) wire) may be adopted to connect the display panel 100 with the system controller 300. A lead of the temperature collector 500 is connected to the signal port wire. Therefore, the temperature of the display panel detected by the temperature collector 500 may be transmitted to the system controller 300 first, so as to cause the system controller 300 to collect the temperature of the display panel detected by the temperature collector 500. Then, the system controller 300 sends the collected temperature to the time sequence controller 200, so as to cause the time sequence controller 200 to be able to obtain the current temperature according to the received temperature. Therefore, design of the conventional COF 220 and the conventional PCB 210 does not need to be changed, redundant pins do not need to be additionally arranged on the COF 220 and the PCB 210, and it can be achieved only by additionally arranging a signal pin on an input port of the time sequence controller 200.

In some embodiments of the present disclosure, as shown in FIG. 3A and FIG. 3B, one temperature collector 500 may be arranged, and then the current temperature is the temperature detected by the temperature collector 500, so that the time sequence controller 200 may directly take the received temperature as the current temperature, which may reduce cost, reduce the calculation amount and prevent the temperature collector 500 from occupying too much space of the non-display region.

Figure 3C:
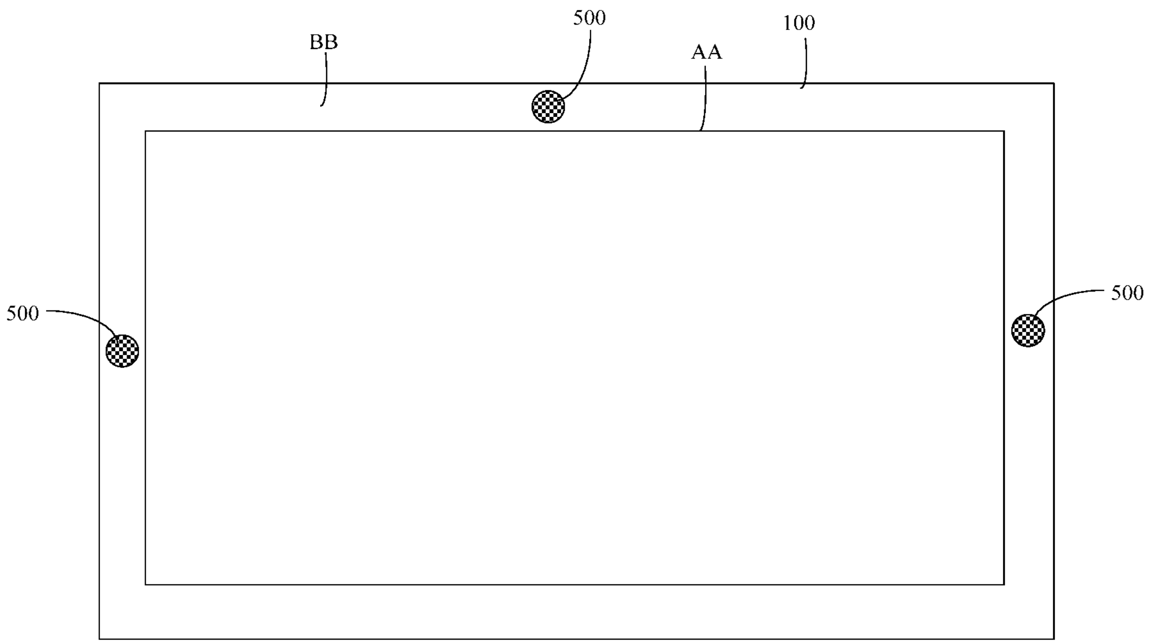
FIG. 3C is some other schematic structural diagrams of a display panel provided by an embodiment of the present disclosure.

In some embodiments of the present disclosure, as shown in FIG. 3C, when at least two temperature collectors 500 are arranged, the temperature collectors 500 may be arranged in the non-display region in a disperse mode. As an example, positions of the temperature collectors 500 may be distributed on the periphery of the display panel on average, and specific positions and numbers may be determined according to the actual display panel, which may reduce the interference effect of the display panel. Objectively speaking, the more the temperature sensors, the more accurate the actually monitored ambient temperature, but additional component changes will increase, for example, additional temperature control feedback pins required on the COF and the PCB will also be increased.

In some embodiments of the present disclosure, when at least two temperature collectors 500 are arranged, the current temperature is an average value of temperatures detected by the temperature collectors 500, so that after the time sequence controller 200 receives the temperature of each temperature collector, the time sequence controller calculates the temperatures and determines the average value, and the current temperature may be obtained.

In some embodiments of the present disclosure, the temperature collector 500 may include: at least one of a temperature sensor and a thermistor. As an example, the temperature collector 500 may be set as the temperature sensor. As shown in combination with FIG. 3A, the temperature of the display panel may be converted into an electric signal (for example, a voltage signal or a current signal) through the temperature sensor, and the electric signal is transmitted to the time sequence controller 200 through the COF 220 and the PCB 210 in turn, wherein the temperature control feedback pins are reserved in the COF 220 and the PCB 210 respectively for transmitting the electric signal. Alternatively, the temperature collector 500 may be set as the thermistor. As shown in combination with FIG. 3A, the temperature of the display panel may be converted into an electric signal (for example, a voltage signal or a current signal) through the thermistor, and the electric signal is transmitted to the time sequence controller 200 through the COF 220 and the PCB 210 in turn, wherein the temperature control feedback pins are reserved in the COF 220 and the PCB 210 respectively for transmitting the electric signal.

It should be illustrated that the number, position and specific implementation of the temperature collector 500 may be determined according to needs of an actual application, which is not limited here.

S200, a current overdrive lookup table corresponding to the current temperature is obtained by calculation according to the current temperature and initial overdrive lookup tables corresponding to prestored set temperatures.

In some embodiments of the present disclosure, a plurality of set temperatures may be set. As an example, the number of set temperatures is M, M initial overdrive lookup tables are prestored, and one set temperature corresponds to one initial overdrive lookup table, wherein M is an integer and M≥2. For example, M may be equal to 2, and therefore two set temperatures may be set: a set temperature TL and a set temperature TH, and TL<TH. The set temperature TL corresponds to one initial overdrive lookup table LUTL, and the set temperature TH corresponds to the other initial overdrive lookup table LUTH. As an example, the set temperature TL and the set temperature TH are respectively set as a lower limit and an upper limit of the temperature. For example, before the display panel is delivered, the temperature of the display panel during work is tested, an approximate temperature range interval of the display panel may be obtained, and therefore a minimum value of the obtained temperature range interval is set as the set temperature TL and a maximum value of the obtained temperature range interval is set as the set temperature TH. For example, if the obtained temperature range interval is 25° C.~40° C., TL=25° C. and TH=40° C. may be set. Certainly, in an actual application, specific number values of TL and TH may be determined according to the needs of the actual application, which is not limited here.

In some embodiments of the present disclosure, as shown in FIG. 3A, the display apparatus may further include: a memory 250. The memory 250 may store the initial overdrive lookup tables corresponding to the set temperatures. For example, taking two set temperatures: the set temperature TL and the set temperature TH as an example, the memory 250 may store the initial overdrive lookup table LUTL corresponding to the set temperature TL and the initial overdrive lookup table LUTH corresponding to the set temperature TH. As an example, the memory 250 may include at least one of an electrically erasable programmable read only memory (EEPROM) 250 and a flash. As an example, the memory 250 may be arranged on a time sequence circuit board 240, so that the memory 250 and the time sequence controller 200 may be arranged to be closer, which further shortens the signal transmittance time.

As an example, the initial overdrive lookup table may include: a plurality of different first gray-scale values, a plurality of different second gray-scale values and initial gray-scale values corresponding to any first gray-scale value and any second gray-scale value. As an example, the initial overdrive lookup table has corresponding gray-scale digits, that is, the first gray-scale values, the second gray-scale values and the initial gray-scale values in the initial overdrive lookup table have corresponding gray-scale digits. For example, the corresponding gray-scale digit of the initial overdrive lookup table is 8 bit, the corresponding gray-scale digits of the first gray-scale values, the second gray-scale values and the initial gray-scale values may be 8 bit, for example, the first gray-scale values in the initial overdrive lookup table may be all gray-scale values in 0~255 gray-scale values in 8 bit, and the second gray-scale values may be all gray-scale values in 0~255 gray-scale values in 8 bit. Or, the first gray-scale values in the initial overdrive lookup table may be part of gray-scale values in 0~255 gray-scale values in 8 bit, and the second gray-scale values may be part of gray-scale values in 0~255 gray-scale values in 8 bit.

As an example, as shown in FIG. 6, which shows the initial overdrive lookup table LUTL corresponding to the set temperature TL in the embodiment of the present disclosure, the initial overdrive lookup table LUTL may include part of first gray-scale values and part of second gray-scale values in 8 bit and the initial gray-scale values corresponding to the first gray-scale values and the second gray-scale values. Numerical values (such as 0, 16, 32, 48, 64, 80, 96, 112, 128, 144, 160, 176, 192, 208, 224, 240 and 255) in a first row in FIG. 6 represent the first gray-scale values, numerical values (such as 0, 16, 32, 48, 64, 80, 96, 112, 128, 144, 160, 176, 192, 208, 224, 240 and 255) in a first column represent the second gray-scale values, and remaining numerical values (such as L1-1~L17-17) represent the initial gray-scale values. It should be illustrated that the specific numerical values of the first gray-scale values and the second gray-scale values shown in FIG. 6 are only illustrated. In the actual application, determining may be made according to the needs of the actual application, which is not limited here. It should be illustrated that the first gray-scale values may correspond to gray-scale values in a sub-pixel of a previous display frame, and the second gray-scale values may correspond to gray-scale values in a sub-pixel of a current display frame.

As an example, as shown in FIG. 7, which shows the initial overdrive lookup table LUTH corresponding to the set temperature TH in the embodiment of the present disclosure, the initial overdrive lookup table LUTH may include part of first gray-scale values and part of second gray-scale values in 8 bit and the initial gray-scale values corresponding to the first gray-scale values and the second gray-scale values. Numerical values (such as 0, 16, 32, 48, 64, 80, 96, 112, 128, 144, 160, 176, 192, 208, 224, 240 and 255) in a first row in FIG. 7 represent the first gray-scale values, numerical values (such as 0, 16, 32, 48, 64, 80, 96, 112, 128, 144, 160, 176, 192, 208, 224, 240 and 255) in a first column represent the second gray-scale values, and remaining numerical values (such as H1-1~H17-17) represent the initial gray-scale values. It should be illustrated that the specific numerical values of the first gray-scale values and the second gray-scale values shown in FIG. 7 are only illustrated. In the actual application, determining may be made according to the needs of the actual application, which is not limited here. It should be illustrated that the first gray-scale values may correspond to gray-scale values in a sub-pixel of a previous display frame, and the second gray-scale values may correspond to gray-scale values in a sub-pixel of a current display frame.

As an example, the current overdrive lookup table may include: a plurality of different first gray-scale values, a plurality of different second gray-scale values and current gray-scale values corresponding to any first gray-scale value and any second gray-scale value. As an example, the current overdrive lookup table has corresponding gray-scale digits, that is, the first gray-scale values, the second gray-scale values and the current gray-scale values in the current overdrive lookup table have corresponding gray-scale digits. For example, the corresponding gray-scale digits of the initial overdrive lookup table and the corresponding gray-scale digits of the current overdrive lookup table may be set same. For example, the gray-scale digits corresponding to the initial overdrive lookup table are 8 bit, and then the gray-scale digits corresponding to the current overdrive lookup table may also be set as 8 bit, that is, in the current overdrive lookup table, the gray-scale digits corresponding to the first gray-scale values, the second gray-scale values and the current gray-scale values may be 8 bit, for example, the first gray-scale values in the current overdrive lookup table may be all gray-scale values in 0~255 gray-scale values in 8 bit, and the second gray-scale values may be all gray-scale values in 0~255 gray-scale values in 8 bit. Or, the first gray-scale values in the current overdrive lookup table may be part of gray-scale values in 0~255 gray-scale values in 8 bit, and the second gray-scale values may be part of gray-scale values in 0~255 gray-scale values in 8 bit.

As an example, as shown in FIG. 8, which shows a current overdrive lookup table LUTD corresponding to a current temperature TD in the embodiment of the present disclosure, the current overdrive lookup table LUTD may include part of first gray-scale values and part of second gray-scale values in 8 bit and current gray-scale values corresponding to the first gray-scale values and the second gray-scale values. Numerical values (such as 0, 16, 32, 48, 64, 80, 96, 112, 128, 144, 160, 176, 192, 208, 224, 240 and 255) in a first row in FIG. 8 represent the first gray-scale values, numerical values (such as 0, 16, 32, 48, 64, 80, 96, 112, 128, 144, 160, 176, 192, 208, 224, 240 and 255) in a first column represent the second gray-scale values, and remaining numerical values (such as D1-1~D17-17) represent the current gray-scale values. It should be illustrated that the specific numerical values of the first gray-scale values and the second gray-scale values shown in FIG. 8 are only illustrated. In the actual application, determining may be made according to the needs of the actual application, which is not limited here. It should be illustrated that the first gray-scale values may correspond to gray-scale values in a sub-pixel of a previous display frame, and the second gray-scale values may correspond to gray-scale values in a sub-pixel of a current display frame.

In some embodiments of the present disclosure, the current overdrive lookup table LUTD corresponding to the current temperature TD may be stored in the time sequence controller. Or, the current overdrive lookup table LUTD corresponding to the current temperature TD may also be stored in the memory, which is not limited here. Therefore, according to the current overdrive lookup table later, the stored current overdrive lookup table LUTD may be called from the time sequence controller or the memory to drive the sub-pixels in the display panel to charge the corresponding data voltages.

In some embodiments of the present disclosure, the current overdrive lookup table LUTD may also be calculated in real time, so that the current overdrive lookup table LUTD corresponding to the calculated current temperature TD may not be stored, so as to save the storage space. Therefore, according to the current overdrive lookup table later, the sub-pixels in the display panel may be driven to charge the corresponding data voltages directly through the current overdrive lookup table LUTD calculated in real time.

In some embodiments of the present disclosure, the time sequence controller may obtain the current overdrive lookup table corresponding to the current temperature by calculation according to the current temperature and the initial overdrive lookup tables corresponding to the prestored set temperatures. As an example, obtaining the current overdrive lookup table corresponding to the current temperature by the calculation according to the current temperature and the initial overdrive lookup tables corresponding to the prestored set temperatures may include: firstly, according to the current temperature, an initial overdrive lookup table corresponding to an $m^{th}$ set temperature and an initial overdrive lookup table corresponding to an $m+1^{th}$ set temperature in the initial overdrive lookup tables corresponding to the M set temperatures are called according to the current temperature, and then each current gray-scale value in the current overdrive lookup table corresponding to the current temperature is obtained by the calculation according to the current temperature, the initial overdrive lookup table corresponding to the $m^{th}$ set temperature and the initial overdrive lookup table corresponding to the $m+1^{th}$ set temperature. For example, the $m^{th}$ set temperature is less than the current temperature, the $m+1^{th}$ set temperature is greater than the current temperature, M is an integer, and $1 \leq M \leq M-1$. For example, the $m^{th}$ set temperature is the set temperature less than and closest to the current temperature; and the $m+1^{th}$ set temperature is the set temperature greater than and closest to the current temperature. For example, when M is equal to 2, a first set temperature is the set temperature less than and closest to the current temperature, and the second set temperature is the set temperature greater than and closest to the current temperature. When M is equal to 3, if the current temperature is greater than the first set temperature and less than the second set temperature, the first set temperature is the set temperature less than and closest to the current temperature, and the second set temperature is the set temperature greater than and closest to the current temperature. If the current temperature is greater than the second set temperature and less than a third set temperature, the second set temperature is the set temperature less than and closest to the current temperature, and the third set temperature is the set temperature greater than and closest to the current temperature.

In some embodiments of the present disclosure, obtaining each current gray-scale value in the current overdrive lookup table corresponding to the current temperature by the calculation according to the current temperature, the initial overdrive lookup table corresponding to the $m^{th}$ set temperature and the initial overdrive lookup table corresponding to the $m+1^{th}$ set temperature may include: firstly, based on a principle of the same first gray-scale value and the same second gray-scale value, that is, one first gray-scale value and one second gray-scale value are selected, a first initial gray-scale value in the initial overdrive lookup table corresponding to the $m^{th}$ set temperature and a second initial gray-scale value in the initial overdrive lookup table corresponding to the $m+1^{th}$ set temperature are determined, and then, the current gray-scale value corresponding to the first initial gray-scale value and the second initial gray-scale value in the current overdrive lookup table is determined according to the current temperature, the $m^{th}$ set temperature, the $m+1^{th}$ set temperature, the first initial gray-scale value and the second initial gray-scale value. For example, determining the current gray-scale value corresponding to the first initial gray-scale value and the second initial gray-scale value in the current overdrive lookup table according to the current temperature, the $m^{th}$ set temperature, the $m+1^{th}$ set temperature, the first initial gray-scale value and the second initial gray-scale value may include: firstly, a computational formula: $D_{a-b}=A_{a-b}t^2+B_{a-b}t+C_{a-b}$, related to the temperature is obtained by fitting according to the $m^{th}$ set temperature, the $m+1^{th}$ set temperature, the first initial gray-scale value and the second initial gray-scale value, and then the current gray-scale value corresponding to the first initial gray-scale value and the second initial gray-scale value in the current overdrive lookup table is determined according to the current temperature and the computational formula, wherein $D_{a-b}$ represents the current gray-scale value corresponding to the first initial gray-scale value (that is, the first initial gray-scale value is determined according to one selected first gray-scale value and one selected second gray-scale value) and the second initial gray-scale value (that is, the second initial gray-scale value is determined according to one selected first gray-scale value and one selected second gray-scale value) determined based on the principle of the same first gray-scale value and the same second gray-scale value, t represents the current temperature, $A_{a-b}$, $B_{a-b}$, and $C_{a-b}$ respectively represent fitting parameters corresponding to the first initial gray-scale value and the second initial gray-scale value determined based on the principle of the same first gray-scale value and the same second gray-scale value, a represents the first initial gray-scale value (that is, the first initial gray-scale value is determined according to one selected first gray-scale value and one selected second gray-scale value) determined based on the principle of the same first gray-scale value and the same second gray-scale value, and b represents the second initial gray-scale value (that is, the second initial gray-scale value is determined according to one selected first gray-scale value and one selected second gray-scale value) determined based on the principle of the same first gray-scale value and the same second gray-scale value.

It should be illustrated that the computational formula: $D_{a-b}=A_{a-b}t^2+B_{a-b}t+C_{a-b}$ related to the temperature obtained by fitting is only an indication, and in the actual application, other applicable formulas may be obtained by fitting according to above conditions. Therefore, in the actual application, the applicable formula may be obtained by fitting according to the above condition according to the needs of the actual application environment, which is not limited here specifically.

In some embodiments of the present disclosure, determining the current gray-scale value corresponding to the first initial gray-scale value and the second initial gray-scale value in the current overdrive lookup table according to the current temperature and the computational formula may include: firstly, a middle gray-scale value corresponding to the first initial gray-scale value and the second initial gray-scale value in the current overdrive lookup table is determined according to the current temperature and the computational formula: $D_{a-b}=A_{a-b}t^2+B_{a-b}t+C_{a-b}$, wherein the middle gray-scale value may be determined as the current gray-scale value when it is determined that the middle gray-scale value is not less than a minimum endpoint gray-scale value and not greater than a maximum endpoint gray-scale value; the minimum endpoint gray-scale value may be determined as the current gray-scale value when it is determined that the middle gray-scale value is less than the minimum endpoint gray-scale value; and the maximum endpoint gray-scale value is determined as the current gray-scale value when it is determined that the middle gray-scale value is greater than the maximum endpoint gray-scale value. For example, taking 8 bit as an example, when $D_{a-b}=127$ is obtained by calculation according to $D_{a-b}=A_{a-b}t^2+B_{a-b}t+C_{a-b}$, 127 may be directly taken as the current gray-scale value to be written in the current overdrive lookup table; when $D_{a-b}=-3$ is obtained by calculation according to $D_{a-b}=A_{a-b}t^2+B_{a-b}t+C_{a-b}$, 0 may be directly taken as the current gray-scale value to be written in the current overdrive lookup table; and when $D_{a-b}=300$ is obtained by calculation according to $D_{a-b}=A_{a-b}t^2+B_{a-b}t+C_{a-b}$, 255 may be directly taken as the current gray-scale value to be written in the current overdrive lookup table.

Figure 10:
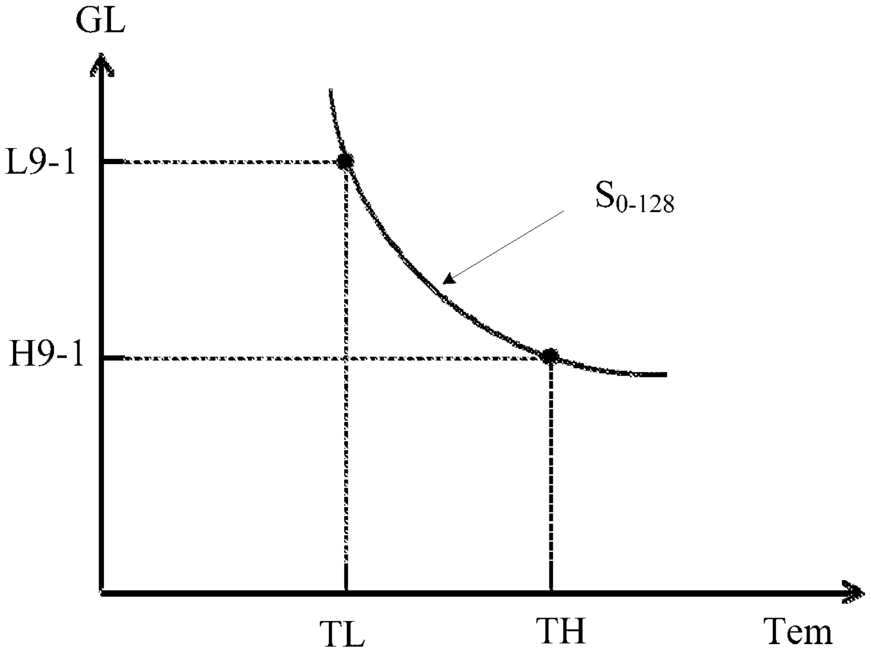
FIG. 10 is some curve schematic diagrams provided by an embodiment of the present disclosure.

Taking M=2, and the current temperature being 33° C. as an example below, the process of calculating the current overdrive lookup table corresponding to the current temperature provided by the embodiment of the present disclosure is illustrated. The memory 250 stores two initial overdrive lookup tables: the initial overdrive lookup table LUTL corresponding to the first set temperature TL (for example, 25° C.) and the initial overdrive lookup table LUTH corresponding to the second set temperature TH (for example, 40° C.). Since the current temperature obtained by the time sequence controller 200 is 33° C., the time sequence controller 200 may determine that the current temperature is different from both the first set temperature TL (for example, 25° C.) and the second set temperature TH (for example, 40° C.), and the time sequence controller 200 may call the initial overdrive lookup table LUTL and the initial overdrive lookup table LUTH from the memory 250. The time sequence controller 200 may determine the first initial gray-scale value L9-1 from the initial overdrive lookup table LUTL and the second initial gray-scale value H9-1 from the initial overdrive lookup table LUTH according to one selected first gray-scale value and one selected second gray-scale value, for example, when the first gray-scale value is selected as 0 and the second gray-scale value is selected as 128. That is, in the formula $D_{a-b}=A_{a-b}t^2+B_{a-b}t+C_{a-b}$, a=0, b=128, $D_{ab}$ is $D_{0-128}$, $A_{a-b}$ is $A_{0-128}$, $B_{a-b}$ is $B_{0-128}$, and $C_{a-b}$ is $C_{0-128}$, that is, $D_{0-128}=A_{0-128}t^2+B_{0-128}t+C_{0-128}$. As shown in combination with FIG. 10, the time sequence controller 200 may obtain a curve $S_{0-128}$ related to the temperature by fitting according to the first set temperature TL (for example, 25° C.), the second set temperature TH (for example, 40° C.), the first initial gray-scale value L9-1 and the second initial gray-scale value H9-1, and a computational formula of the curve $S_{0-128}$ may be: $D_{0-128}=A_{0-128}t^2+B_{0-128}t+C_{0-128}$. The current temperature 33° C. is substituted into the formula $D_{0-128}=A_{0-128}t^2+B_{0-128}t+C_{0-128}$, which may obtain the corresponding middle gray-scale value $D_{0-128}$=D9-1 when the first gray-scale value is 0 and the second gray-scale value is 128, and when the middle gray-scale value $D_{0-128}$=D9-1 is not less than 0 and not greater than 255, D9-1 may be determined as the current gray-scale value to be written in the current overdrive lookup table LUTD.

Figure 11:
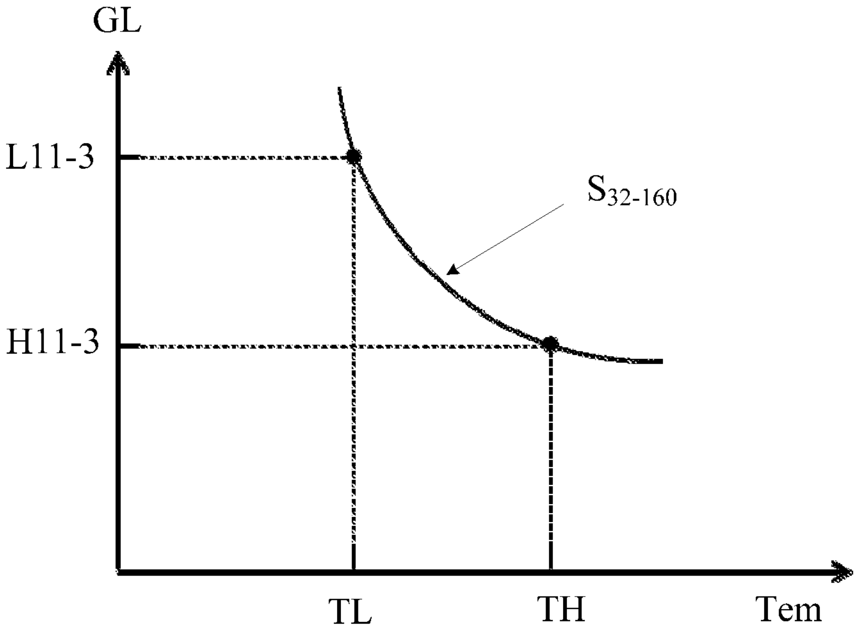
FIG. 11 is some other curve schematic diagrams provided by an embodiment of the present disclosure.

Moreover, the time sequence controller 200 may determine a first initial gray-scale value L11-3 from the initial overdrive lookup table LUTL and a second initial gray-scale value H11-3 from the initial overdrive lookup table LUTH according to one selected first gray-scale value and one selected second gray-scale value, for example, when the first gray-scale value is selected as 32 and the second gray-scale value is selected as 160, that is, in the formula $D_{a-b}=A_{a-b}t^2+B_{a-b}t+C_{a-b}$, a=32, b=160, $D_{ab}$ is $D_{32-160}$, $A_{a-b}$ is $A_{32-160}$, $B_{a-b}$ is $B_{32-160}$, and $C_{a-b}$ is $C_{32-160}$, that is, $D_{32-160}=A_{32-160}t^2+B_{32-160}t+C_{32-160}$. As shown in combination with FIG. 11, the time sequence controller 200 may obtain a curve $S_{32-160}$ related to the temperature by fitting according to the first set temperature TL (for example, 25° C.), the second set temperature TH (for example, 40° C.), the first initial gray-scale value L11-3 and the second initial gray-scale value H11-3, and a computational formula of the curve $S_{32-160}$ may be: $D_{32-160}=A_{32-160}t^2+B_{32-160}t+C_{32-160}$. The current temperature 33° C. is substituted into the formula $D_{32-160}=A_{32-160}t^2+B_{32-160}t+C_{32-160}$, which may obtain the corresponding middle gray-scale value $D_{32-160}$=D11-3 when the first gray-scale value is 32 and the second gray-scale value is 160, and when the middle gray-scale value $D_{32-160}$=D11-3 is not less than 0 and not greater than 255, D11-3 may be determined as the current gray-scale value to be written in the current overdrive lookup table LUTD. It should be illustrated that in FIG. 10 and FIG. 11, an abscissa Tem represents time, and an ordinate GL represents a gray-scale value. Moreover, a calculation process of current gray-scale values corresponding to remaining first gray-scale values and second gray-scale values is basically same as the above process, and the rest can be done in the same manner, which is not repeated.

Taking M=3, and the current temperature being 33° C. as an example below, the process of calculating the current overdrive lookup table corresponding to the current temperature provided by the embodiment of the present disclosure is illustrated. The memory 250 stores three initial overdrive lookup tables: an initial overdrive lookup table LUTL corresponding to the first set temperature TL (for example, 25° C.), an initial overdrive lookup table LUTZ corresponding to the second set temperature TZ (for example, 30° C.) and an initial overdrive lookup table LUTH corresponding to a third set temperature TH (for example, 40° C.). As an example, as shown in FIG. 12, which shows the initial overdrive lookup table LUTZ corresponding to the set temperature TZ in the embodiment of the present disclosure, the initial overdrive lookup table LUTZ may include part of first gray-scale values and part of second gray-scale values in 8 bit and initial gray-scale values corresponding to the first gray-scale values and the second gray-scale values. Numerical values (such as 0, 16, 32, 48, 64, 80, 96, 112, 128, 144, 160, 176, 192, 208, 224, 240 and 255) in a first row in FIG. 12 represent the first gray-scale values, numerical values (such as 0, 16, 32, 48, 64, 80, 96, 112, 128, 144, 160, 176, 192, 208, 224, 240 and 255) in a first column represent the second gray-scale values, and remaining numerical values (such as Z1-1~Z17-17) represent the initial gray-scale values. It should be illustrated that the specific numerical values of the first gray-scale values and the second gray-scale values shown in FIG. 12 are only illustrated. In the actual application, determining may be made according to the needs of the actual application, which is not limited here. It should be illustrated that the first gray-scale values may correspond to gray-scale values in a sub-pixel of a previous display frame, and the second gray-scale values may correspond to gray-scale values in a sub-pixel of a current display frame.

Figure 13:
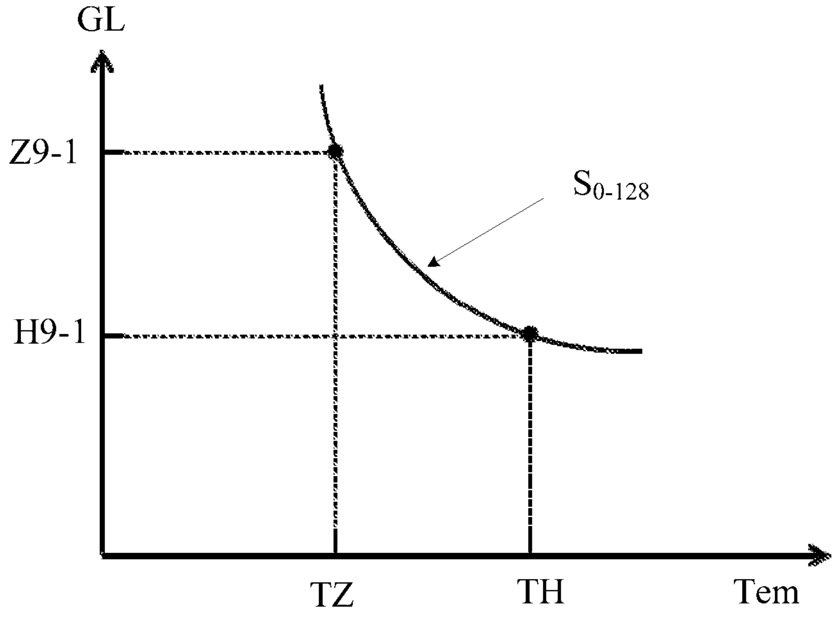
FIG. 13 is yet some curve schematic diagrams provided by an embodiment of the present disclosure.

Since the current temperature obtained by the time sequence controller 200 is 33° C., the time sequence controller 200 may determine that the current temperature is different from all the first set temperature TL (for example, 25° C.), the second set temperature TZ (for example, 30° C.) and the third set temperature TH (for example, 40° C.), and the time sequence controller 200 may call the initial overdrive lookup table LUTZ corresponding to the second set temperature TZ closest to the current temperature and less than the current temperature and the initial overdrive lookup table LUTH corresponding to the third set temperature TH closest to the current temperature and greater than the current temperature from the memory 250. The time sequence controller 200 may determine the first initial gray-scale value Z9-1 from the initial overdrive lookup table LUTZ and the second initial gray-scale value H9-1 from the initial overdrive lookup table LUTH according to one selected first gray-scale value and one selected second gray-scale value, for example, when the first gray-scale value is selected as 0 and the second gray-scale value is selected as 128, that is, in the formula $D_{a\text{-}b}=A_{a\text{-}b}t^2+B_{a\text{-}b}t+C_{a\text{-}b}$, a=0, b=128, $D_{ab}$ is $D_{0\text{-}128}$, $A_{a\text{-}b}$ is $A_{0\text{-}128}$, $B_{a\text{-}b}$ is $B_{0\text{-}128}$, and $C_{a\text{-}b}$ is $C_{0\text{-}128}$, that is, $D_{0\text{-}128}=A_{0\text{-}128}t^2+B_{0\text{-}128}t+C_{0\text{-}128}$. As shown in combination with FIG. 13, the time sequence controller 200 may obtain a curve $S_{0\text{-}128}$ related to the temperature by fitting according to the second set temperature TZ (for example, 30° C.), the third set temperature TH (for example, 40° C.), the first initial gray-scale value Z9-1 and the second initial gray-scale value H9-1, and a computational formula of the curve $S_{0\text{-}128}$ may be: $D_{0\text{-}128}=A_{0\text{-}128}t^2+B_{0\text{-}128}t+C_{0\text{-}128}$. The current temperature 33° C. is substituted into the formula $D_{0\text{-}128}=A_{0\text{-}128}t^2+B_{0\text{-}128}t+C_{0\text{-}128}$, which may obtain the corresponding middle gray-scale value $D_{0\text{-}128}$=D9-1 when the first gray-scale value is 0 and the second gray-scale value is 128, and when the middle gray-scale value $D_{0\text{-}128}$=D9-1 is not less than 0 and not greater than 255, D9-1 may be determined as the current gray-scale value to be written in the current overdrive lookup table LUTD.

Figure 14:
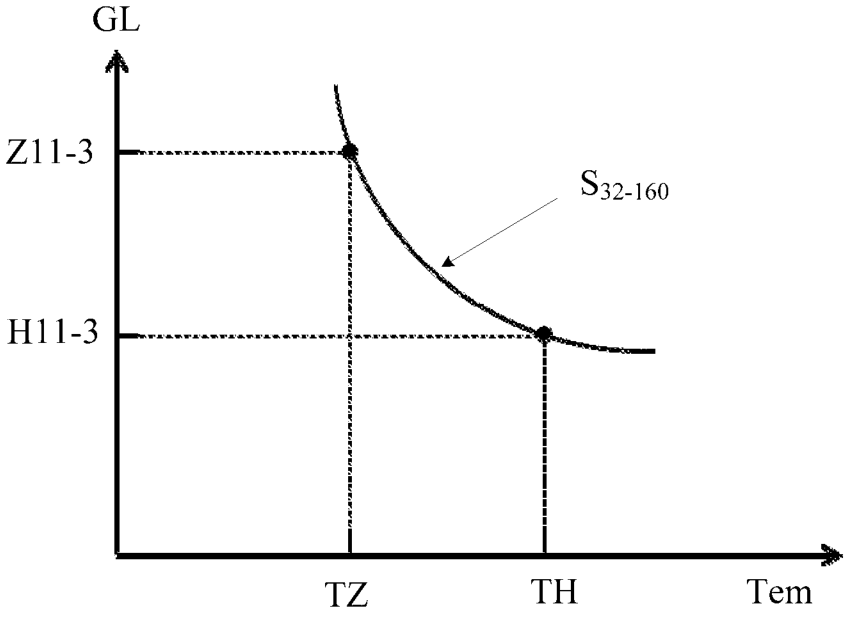
FIG. 14 is yet some curve schematic diagrams provided by an embodiment of the present disclosure.

Moreover, the time sequence controller 200 may determine a first initial gray-scale value Z11-3 from the initial overdrive lookup table LUTZ and a second initial gray-scale value H11-3 from the initial overdrive lookup table LUTH according to one selected first gray-scale value and one selected second gray-scale value, for example, when the first gray-scale value is selected as 32 and the second gray-scale value is selected as 160, that is, in the formula $D_{a\text{-}b}=A_{a\text{-}b}t^2+B_{a\text{-}b}t+C_{a\text{-}b}$, a=32, b=160, $D_{ab}$ is $D_{32\text{-}160}$, $A_{a\text{-}b}$ is $A_{32\text{-}160}$, $B_{a\text{-}b}$ is $B_{32\text{-}160}$, and $C_{a\text{-}b}$ is $C_{32\text{-}160}$, that is, $D_{32\text{-}160}=A_{32\text{-}160}t^2+B_{32\text{-}160}t+C_{32\text{-}160}$. As shown in combination with FIG. 14, the time sequence controller 200 may obtain a curve $S_{32\text{-}160}$ by fitting according to the second set temperature TZ (for example, 30° C.), the third set temperature TH (for example, 40° C.), the first initial gray-scale value Z11-3 and the second initial gray-scale value H11-3, and a computational formula of the curve $S_{32\text{-}160}$ may be: $D_{32\text{-}160}=A_{32\text{-}160}t^2+B_{32\text{-}160}t+C_{32\text{-}160}$. The current temperature 33° C. is substituted into the formula $D_{32\text{-}160}=A_{32\text{-}160}t^2+B_{32\text{-}160}t+C_{32\text{-}160}$, which may obtain the corresponding gray-scale value $D_{32\text{-}160}$=D11-3 when the first gray-scale value is 32 and the second gray-scale value is 160, and when the middle gray-scale value $D_{32\text{-}160}$=D11-3 is not less than 0 and not greater than 255, D11-3 may be determined as the current gray-scale value to be written in the current overdrive lookup table LUTD. It should be illustrated that in FIG. 13 and FIG. 14, an abscissa Tem represents time, and an ordinate GL represents a gray-scale value. Moreover, a calculation process of current gray-scale values corresponding to remaining first gray-scale values and second gray-scale values is basically same as the above process, and the rest can be done in the same manner, which is not repeated.

It should be illustrated that the quantity of initial overdrive lookup tables stored in the memory 250 may be set as 2 or 3, and therefore, the quantity of the initial overdrive lookup tables may be reduced as much as possible, so as to save the storage space. Certainly, the quantity of initial overdrive lookup tables may also be determined according to the needs of the actual application, which is not limited here.

S300, according to the current overdrive lookup table, the sub-pixels in the display panel are driven to charge corresponding data voltages.

In some embodiments of the present disclosure, the step S300 may include: in each display frame after the current overdrive lookup table is determined, the sub-pixels in the display panel are driven to charge the corresponding data voltages according to the current overdrive lookup table. For example, the time sequence controller 200 may determine a gray-scale value corresponding to each sub-pixel of the current display frame according to display data (the display data include a digital voltage form of the data voltage carrying the corresponding gray-scale value in one-to-one correspondence to each sub-pixel) of the current display frame (for example, a display frame after the current overdrive lookup table is determined). According to display data (the display data include a digital voltage form of the data voltage carrying the corresponding gray-scale value in one-to-one correspondence to each sub-pixel) of the previous display frame, a gray-scale value corresponding to each sub-pixel of the current display frame is determined. According to the gray-scale value corresponding to the same sub-pixel in the current display frame and the previous display frame, the current gray-scale value corresponding to the sub-pixel is determined from the current overdrive lookup table. The time sequence controller 200 may send the determined current gray-scale value to the source electrode drive circuit 120. The source electrode drive circuit 120 may load the data voltage corresponding to the current gray-scale value to the data line connected with the sub-pixel according to the current gray-scale value, so as to cause the sub-pixel to be able to charge the data voltage corresponding to the current gray-scale value.

As an example, the gray-scale value of the previous display frame used by determining the current gray-scale value corresponding to the sub-pixel from the current overdrive lookup table may be the current gray-scale value of the previous display frame. Certainly, the gray-scale value of the previous display frame used by determining the current gray-scale value corresponding to the sub-pixel from the current overdrive lookup table may be the original gray-scale value of the previous display frame. The original gray-scale value may be a gray-scale value corresponding to received display data.

As an example, the gray-scale value of the current display frame used by determining the current gray-scale value corresponding to the sub-pixel from the current overdrive lookup table may be the original gray-scale value of the current display frame. The original gray-scale value may be the gray-scale value corresponding to the received display data.

Figure 9:
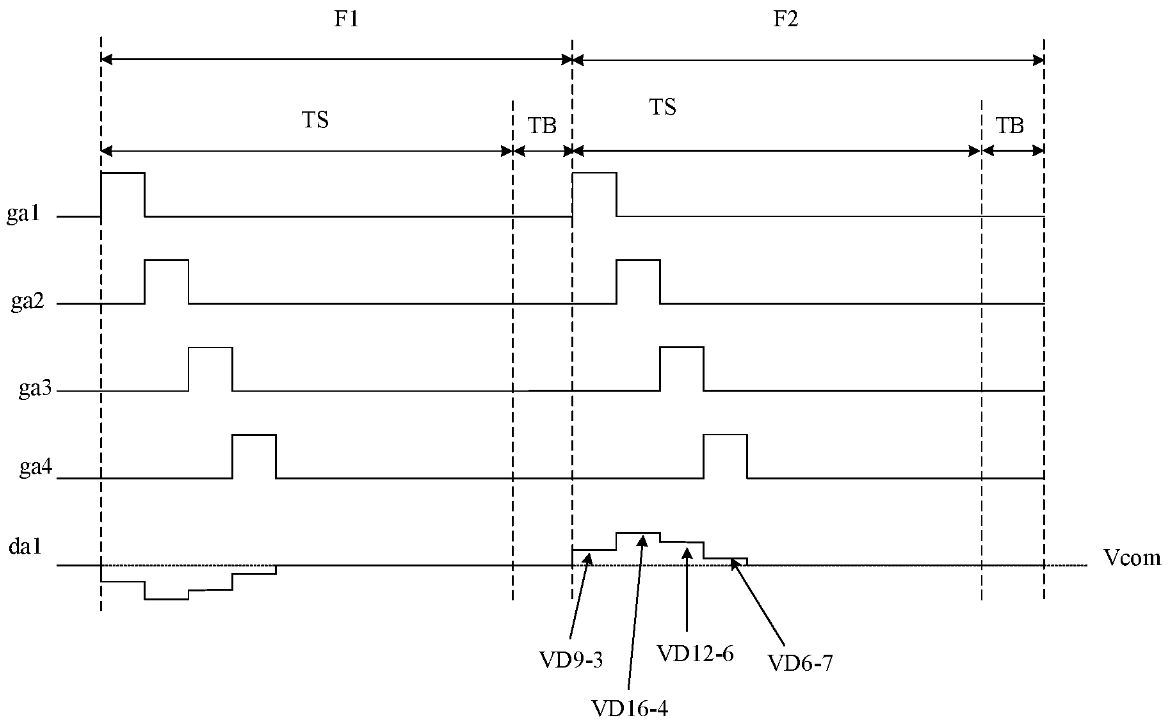
FIG. 9 is some signal time sequence diagrams provided by an embodiment of the present disclosure.

As an example, the display panel works in a plurality of continuous display frames, and each display frame may include a data refresh stage and a blanking time stage. As shown in combination with FIG. 9, taking the display frame F1 and the display frame F2 as examples, the display frame F1 and the display frame F2 may include the data refresh stage TS and the blanking time stage TB. Moreover, the display frame F2 serves as a first display frame after determining the current overdrive lookup table. Taking a sub-pixel A1 in a first row, a sub-pixel A2 in a second row, a sub-pixel A3 in a third row and a sub-pixel A4 in a fourth row in the same column connected through the data line DA1 as examples, if a gray-scale value of the sub-pixel A1 in the display frame F1 is 32 and a gray-scale value in the display frame F2 is 128, therefore a current gray-scale value D9-3 corresponding to the sub-pixel A1 may be found from the current overdrive lookup table. In a similar way, a current gray-scale value D16-4 corresponding to the sub-pixel A2 may be found, a current gray-scale value D12-6 corresponding to the sub-pixel A3 may be found, and a current gray-scale value D6-7 corresponding to the sub-pixel A4 may be found.

Moreover, the current gray-scale values of D9-3, D16-4, D12-6 and D6-7 may be input into the source electrode drive circuit 120, in the data refresh stage TS of the display frame F2, the gate electrode drive circuit 110 loads a signal ga1 to a grid line GA1, loads a signal ga2 to a grid line GA2, loads a signal ga3 to a grid line GA3 and loads a signal ga4 to a grid line GA4, when a gate electrode cut-in voltage (such as a voltage corresponding to a high level) appears in the signals ga1~ga4, turn-on operation of the corresponding transistors 010 may be controlled.

The source electrode drive circuit 120 sequentially loads a data voltage VD9-3 corresponding to the current gray-scale value D9-3, a data voltage VD16-4 corresponding to the current gray-scale value D16-4, a data voltage VD12-6 corresponding to the current gray-scale value D12-6, and a data voltage VD6-7 corresponding to the current gray-scale value D6-7 to the data line DA1. As an example, when the gate electrode turn-on voltage appears in the signal ga1, all the transistors 01 in the first row of sub-pixels may be controlled to be turned on, and the corresponding data voltage VD9-3 is loaded to the data line DA1, so that the data voltage VD9-3 is input into a pixel electrode 02 of the sub-pixel A1 in the first row of sub-pixels. When the gate electrode turn-on voltage appears in the signal ga2, all the transistors 01 in the second row of sub-pixels may be controlled to be turned on, and the corresponding data voltage VD16-4 is loaded to the data line DA1, so that the data voltage VD16-4 is input into a pixel electrode 02 of the sub-pixel A2 in the second row of sub-pixels. When the gate electrode turn-on voltage appears in the signal ga3, all the transistors 01 in the third row of sub-pixels may be controlled to be turned on, and the corresponding data voltage VD12-6 is loaded to the data line DA1, so that the data voltage VD12-6 is input into a pixel electrode 02 of the sub-pixel A3 in the third row of sub-pixels. When the gate electrode turn-on voltage appears in the signal ga4, all the transistors 01 in the fourth row of sub-pixels may be controlled to be turned on, and the corresponding data voltage VD6-7 is loaded to the data line DA1, so that the data voltage VD6-7 is input into a pixel electrode 02 of the sub-pixel A4 in the fourth row of sub-pixels. Remaining rows can be done in the same manner, which is not repeated. Moreover, in the blanking time stage TB, the signals ga1~ga4 are all low levels, and the transistors 01 in each sub-pixel are all in a stop state. Moreover, the data lines DA1-DA3 may not load voltages, which are all in a suspension joint state.

It should be illustrated that after the temperature collector 500 detects the temperature of the display panel each time, the current overdrive lookup table will be determined at a time, and in each display frame after the current overdrive lookup table is determined, according to the current overdrive lookup table, the sub-pixels in the drive panel are driven to charge the corresponding data voltages. In other words, if the above steps of S100~S200 are executed again, after a new current overdrive lookup table is determined, in each display frame after the current overdrive lookup table is determined, the sub-pixels in the display panel are driven to charge the corresponding data voltages according to the new current overdrive lookup table.

In some embodiments of the present disclosure, step S200: obtaining the current overdrive lookup table corresponding to the current temperature by the calculation according to the current temperature and the initial overdrive lookup tables corresponding to the prestored set temperatures may include: when the current temperature is different from the M set temperatures, the current overdrive lookup table corresponding to the current temperature is obtained by the calculation according to the current temperature and the initial overdrive lookup tables corresponding to the prestored set temperatures. Therefore, since the current temperature is different from all the M set temperatures, the lookup table corresponding to the current temperature cannot be called from the stored initial overdrive lookup tables, and the current overdrive lookup table corresponding to the current temperature is obtained by the calculation according to the current temperature and the stored initial overdrive lookup tables, so that according to the current temperature of the display panel, the overdrive lookup table is dynamically adjusted, so as to drive the display panel to perform display through the adjusted current overdrive lookup table, and the problem of poor color inverting of the motion image may be solved.

In some embodiments of the present disclosure, when the current temperature and one set temperature in the M set temperatures are the same, the initial overdrive lookup table corresponding to the set temperature the same with the current temperature in the M set temperatures is called according to the current temperature. The sub-pixels in the display panel are driven to charge the corresponding data voltages according to the called initial overdrive lookup table. Taking M=2, and the current temperature being 25° C. as an example, the memory 250 stores two initial overdrive lookup tables: the initial overdrive lookup table LUTL corresponding to the first set temperature TL (for example, 25° C.) and the initial overdrive lookup table LUTH corresponding to the second set temperature TH (for example, 40° C.). The time sequence controller 200 may determine that the current temperature and the first set temperature TL are the same, and call the initial overdrive lookup table LUTL from the memory 250. Therefore, in each display frame after the initial overdrive lookup table LUTL corresponding to the set temperature the same with the current temperature, the sub-pixels in the display panel may be driven to charge the corresponding data voltages according to the called initial overdrive lookup table LUTL.

Those skilled in the art should understand that embodiments of the present disclosure may be provided as a method, a system or a computer program product. Therefore, the present disclosure may adopt forms of a complete hardware embodiment, a complete software embodiment or an embodiment in combination with software and hardware aspects. Moreover, the present disclosure may adopt a form of the computer program product implemented on one or more computer available storage media (including, but not limited to a magnetic disk memory 250, a CD-ROM, an optical memory 250, etc.) including computer available program codes.

The present disclosure is described by reference to flow diagrams and/or block diagrams of the method, device (system), and computer program production accordance with the embodiments of the present disclosure. It should be understood that computer program instructions may achieve each flow and/or block in the flow diagrams and/or block diagrams and a combination of flows and/or blocks in the flow diagrams and/or block diagrams. The computer program instructions may be provided for processors of a general-purpose computer, a specialized computer, an embedded processor, or other programmable data-processing devices to produce a machine, so that the instructions executed by the processor of the computer or other programmable data processing devices produce an apparatus configured to implement a function specified in one flow or a plurality of flows of the flow diagrams or one block or a plurality of blocks in the block diagrams.

These computer program instructions may also be stored in the computer readable memory 250 able to guide the computer or other programmable data processing devices to work in a specific mode, so that the instructions stored in the computer readable memory 250 generate products including an instruction apparatus, and the instruction apparatus implements a function specified in one flow or a plurality of flows of the flow diagrams or one block or a plurality of blocks in the block diagrams.

The computer program instructions may also be loaded to the computer or other programmable data processing devices, so that a series of operation steps are executed on the computer or other programmable data processing devices to generate processing implemented by the computer, and therefore the instructions executed on the computer or other programmable data processing devices provide steps used for implementing a function specified in one flow or a plurality of flows of the flow diagrams or one block or a plurality of blocks in the block diagrams.

Although the preferred embodiments of the present disclosure have been described, once those skilled in the art know basic creative concepts, they can make additional changes and modifications to the embodiments of the present disclosure. Therefore, appended claims are intended to be illustrated to include the preferred embodiments and all changes and modifications falling within the scope of the present disclosure.

Obviously, those skilled in the art may perform various alterations and variations on the embodiments of the present disclosure without departing from the spirit and scope of the embodiments of the present disclosure. Therefore, if these modifications and variations of the embodiments of the present disclosure fall within the scope of the claims of the present disclosure and the equivalent technology thereof, the present disclosure is also intended to include these alterations and variations.

What is claimed is:

1. A method for driving a display panel, comprising:

obtaining a current temperature of the display panel;

calling an initial overdrive lookup table corresponding to an $m^{th}$ set temperature and an initial overdrive lookup table corresponding to an $m+1^{th}$ set temperature in the initial overdrive lookup tables corresponding to the M set temperatures according to the current temperature, wherein the $m^{th}$ set temperature is less than the current temperature, the $m+1^{th}$ set temperature is greater than the current temperature, m is the integer, and $1 \leq m \leq M-1$; wherein a quantity of the set temperatures is M, M is an integer, and $M \geq 2$;

determining a first initial gray-scale value in the initial overdrive lookup table corresponding to the $m^{th}$ set temperature and a second initial gray-scale value in the initial overdrive lookup table corresponding to the $m+1^{th}$ set temperature in a case of same first gray-scale values and same second gray-scale values;

obtaining a computational formula related to the temperature by fitting according to the $m^{th}$ set temperature, the $m+1^{th}$ set temperature, the first initial gray-scale value and the second initial gray-scale value;

determining a current gray-scale value corresponding to the first initial gray-scale value and the second initial gray-scale value in the current overdrive lookup table according to the current temperature and the computational formula wherein the initial overdrive lookup tables comprise a plurality of different first gray-scale values, a plurality of different second gray-scale values and initial gray-scale values corresponding to any first gray-scale value and any second gray-scale value, and the current overdrive lookup table comprises a plurality of different first gray-scale values, a plurality of different second gray-scale values and current gray-scale values corresponding to any first gray-scale value and any second gray-scale value; and driving sub-pixels in the display panel to charge corresponding data voltages according to the current overdrive lookup table;

wherein the determining a current gray-scale value corresponding to the first initial gray-scale value and the second initial gray-scale value in the current overdrive lookup table according to the current temperature and the computational formula, comprises:

determining a middle gray-scale value corresponding to the first initial gray-scale value and the second initial gray-scale value in the current overdrive lookup table according to the current temperature and the computational formula;

determining the middle gray-scale value as the current gray-scale value in response to the middle gray-scale value not being less than a minimum endpoint gray-scale value and not being greater than a maximum endpoint gray-scale value;

determining the minimum endpoint gray-scale value as the current gray-scale value in response to the middle gray-scale value being less than the minimum endpoint gray-scale value; and determining the maximum endpoint gray-scale value as the current gray-scale value in response to the middle gray-scale value being greater than the maximum endpoint gray-scale value;

wherein the computational formula is:

$$D_{a-b} = A_{a-b}t^2 + B_{a-b}t + C_{a-b};$$

wherein $D_{a-b}$ represents the middle gray-scale value corresponding to the first initial gray-scale value and the second initial gray-scale value determined in a case of same first gray-scale values and same second gray-scale values, t represents the current temperature, $A_{a-b}$, $B_{a-b}$, and $C_{a-b}$ respectively represent fitting parameters corresponding to the first initial gray-scale value and the second initial gray-scale value determined in a case of same first gray-scale values and same second gray-scale values, a represents the first initial gray-scale value determined in a case of same first gray-scale values and same second gray-scale values, and b represents the second initial gray-scale value determined in a case of same first gray-scale values and same second gray-scale values.

2. The method of the display panel according to claim 1, wherein the $m^{th}$ set temperature is a set temperature less than and closest to the current temperature; and the $m+1^{th}$ set temperature is a set temperature greater than and closest to the current temperature.

3. The method of the display panel according to claim 1, wherein M≤3.

4. The drive method of the display panel according to claim 1, wherein in response to the current temperature being identical to one set temperature in the M set temperatures, invoking an initial overdrive lookup table corresponding to the set temperature identical to the current temperature in the M set temperatures according to the current temperature; and driving the sub-pixels in the display panel to charge corresponding data voltages according to invoked initial overdrive lookup table.

5. A display apparatus, comprising:

a display panel;

a memory configured to store initial overdrive lookup tables corresponding to set temperatures;

a temperature collector configured to detect a temperature of the display panel; and a time sequence controller configured to obtain a current temperature of the display panel detected by the temperature collector, call an initial overdrive lookup table corresponding to an $m^{th}$ set temperature and an initial overdrive lookup table corresponding to an $m+1^{th}$ set temperature in the initial overdrive lookup tables corresponding to the M set temperatures according to the current temperature, wherein the $m^{th}$ set temperature is less than the current temperature, the $m+1^{th}$ set temperature is greater than the current temperature, m is the integer, and 1≤m≤M−1; wherein a quantity of the set temperatures is M, M is an integer, and M≥2; determine a first initial gray-scale value in the initial overdrive lookup table corresponding to the $m^{th}$ set temperature and a second initial gray-scale value in the initial overdrive lookup table corresponding to the $m+1^{th}$ set temperature in a case of same first gray-scale values and same second gray-scale values; obtain a computational formula related to the temperature by fitting according to the $m^{th}$ set temperature, the $m+1^{th}$ set temperature, the first initial gray-scale value and the second initial gray-scale value; determine a middle gray-scale value corresponding to the first initial gray-scale value and the second initial gray-scale value in the current overdrive lookup table according to the current temperature and the computational formula; determine the middle gray-scale value as the current gray-scale value in response to the middle gray-scale value not being less than a minimum endpoint gray-scale value and not being greater than a maximum endpoint gray-scale value; determine the minimum endpoint gray-scale value as the current gray-scale value in response to the middle gray-scale value being less than the minimum endpoint gray-scale value; and determine the maximum endpoint gray-scale value as the current gray-scale value in response to the middle gray-scale value being greater than the maximum endpoint gray-scale value, and drive sub-pixels in the display panel to charge corresponding data voltages according to the current overdrive lookup table, wherein the initial overdrive lookup tables comprise a plurality of different first gray-scale values, a plurality of different second gray-scale values and initial gray-scale values corresponding to any first gray-scale value and any second gray-scale value, and the current overdrive lookup table comprises a plurality of different first gray-scale values, a plurality of different second gray-scale values and current gray-scale values corresponding to any first gray-scale value and any second gray-scale value;

wherein the computational formula is:

$$D_{a-b}=A_{a-b}t^2+B_{a-b}t+C_{a-b};$$

wherein $D_{a-b}$ represents the middle gray-scale value corresponding to the first initial gray-scale value and the second initial gray-scale value determined in a case of same first gray-scale values and same second gray-scale values, t represents the current temperature, $A_{a-b}$, $B_{a-b}$, and $C_{a-b}$ respectively represent fitting parameters corresponding to the first initial gray-scale value and the second initial gray-scale value determined in a case of same first gray-scale values and same second gray-scale values, a represents the first initial gray-scale value determined in a case of same first gray-scale values and same second gray-scale values, and b represents the second initial gray-scale value determined in a case of same first gray-scale values and same second gray-scale values.

6. The display apparatus according to claim 5, wherein the time sequence controller is further configured to directly collect the temperature of the display panel detected by the temperature collector from the temperature collector, and obtain the current temperature according to the collected temperature.

7. The display apparatus according to claim 5, further comprising: a system controller, wherein the system controller is configured to directly collect the temperature of the display panel detected by the temperature collector from the temperature collector, and send collected temperature to the time sequence controller; and the time sequence controller is further configured to obtain the current temperature according to received temperature.

8. The display apparatus according to claim 5, wherein at least one temperature collector is arranged, and the temperature collector is arranged in a non-display region of the display panel.

9. The display apparatus according to claim 8, wherein in response to at least two temperature collectors being arranged, the temperature collectors are arranged in the non-display region in a disperse mode, and the current temperature is an average value of temperatures detected by the temperature collectors; and in response to at least one temperature collector being arranged, the current temperature is the temperature detected by the temperature collector.

10. The display apparatus according to claim 5, wherein the temperature collector comprises at least one of a temperature sensor and a thermistor.

* * * * *